(12) United States Patent
Yoshizawa et al.

(10) Patent No.: US 10,884,316 B2
(45) Date of Patent: Jan. 5, 2021

(54) LIGHT AMOUNT ADJUSTING DEVICE AND OPTICAL DEVICE

(71) Applicant: CANON DENSHI KABUSHIKI KAISHA, Chichibu (JP)

(72) Inventors: Takahito Yoshizawa, Kawaguchi (JP); Hironori Komiya, Yamato (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 175 days.

(21) Appl. No.: 16/135,016

(22) Filed: Sep. 19, 2018

(65) Prior Publication Data
US 2019/0018304 A1    Jan. 17, 2019

Related U.S. Application Data

(63) Continuation of application No. PCT/JP2017/007933, filed on Feb. 28, 2017.

(30) Foreign Application Priority Data

Mar. 31, 2016  (JP) .................................. 2016-072503
Jul. 29, 2016  (JP) .................................. 2016-150439

(51) Int. Cl.
*G03B 9/04*    (2006.01)
*G03B 9/06*    (2006.01)

(52) U.S. Cl.
CPC ..................................... *G03B 9/06* (2013.01)

(58) Field of Classification Search
CPC .............. G03B 9/04; G03B 9/06; G03B 9/14
See application file for complete search history.

(56) References Cited

U.S. PATENT DOCUMENTS 6,811,331 B2    11/2004 Iwasa
7,374,353 B2     5/2008 Masuda
(Continued)

FOREIGN PATENT DOCUMENTS

CN    1480783 A    3/2004
CN    1758131 A    4/2006
(Continued)

OTHER PUBLICATIONS

May 16, 2017 International Search Report in International Patent Appln. No. PCT/JP2017/007933.
(Continued)

*Primary Examiner* — Minh Q Phan
(74) *Attorney, Agent, or Firm* — Venable LLP

(57) ABSTRACT

A light amount adjusting device includes an opening forming member configured to form an opening portion through which light passes, a blade group configured to move on the opening forming member and form a part of a light passing opening in the opening portion, and a power transmission member arranged outside the opening portion and engaging with the blade group to transmit power. The blade group includes a straight blade configured to move linearly and a swing blade configured to swing from both sides in a straight-ahead operation of the straight blade toward a center of the light passing opening. An edge portion of the light passing opening on a side of the power transmission member or an edge portion on a side opposite to the side of the power transmission member is formed by the blade group.

19 Claims, 26 Drawing Sheets

(56) References Cited

U.S. PATENT DOCUMENTS

| | | |
|---|---|---|
| 7,422,381 B2 | 9/2008 | Nakano |
| 7,573,629 B2 | 8/2009 | Bai |
| 7,878,721 B2 | 2/2011 | Azuma et al. |
| 9,007,671 B2 | 4/2015 | Yoshizawa et al. |
| 10,025,161 B2 * | 7/2018 | Masae .................. G03B 9/06 |
| 2006/0078331 A1 | 4/2006 | Masuda |
| 2006/0153560 A1 | 7/2006 | Masuda |
| 2009/0034046 A1 | 2/2009 | Bai |
| 2009/0116832 A1 | 5/2009 | Azuma et al. |
| 2013/0170009 A1 | 7/2013 | Yoshizawa et al. |

FOREIGN PATENT DOCUMENTS

| | | |
|---|---|---|
| CN | 1846166 A | 10/2006 |
| CN | 103080830 A | 5/2013 |
| JP | H02-048928 U | 4/1990 |
| JP | H04-119434 U | 10/1992 |
| JP | H09-311363 A | 12/1997 |
| JP | 2006-178366 A | 7/2006 |
| JP | 2007-114672 A | 5/2007 |
| JP | 2008-070824 A | 3/2008 |
| JP | 2009-031664 A | 2/2009 |
| JP | 2009-115831 A | 5/2009 |
| JP | 2012-220761 A | 11/2012 |
| WO | 2012/026104 A1 | 3/2012 |

OTHER PUBLICATIONS

Feb. 22, 2019 European Search Report in European Patent Appln. No. 17774022.2.
Apr. 20, 2020 Chinese Official Action in Chinese Patent Appln. No. 201780020338.5.

* cited by examiner

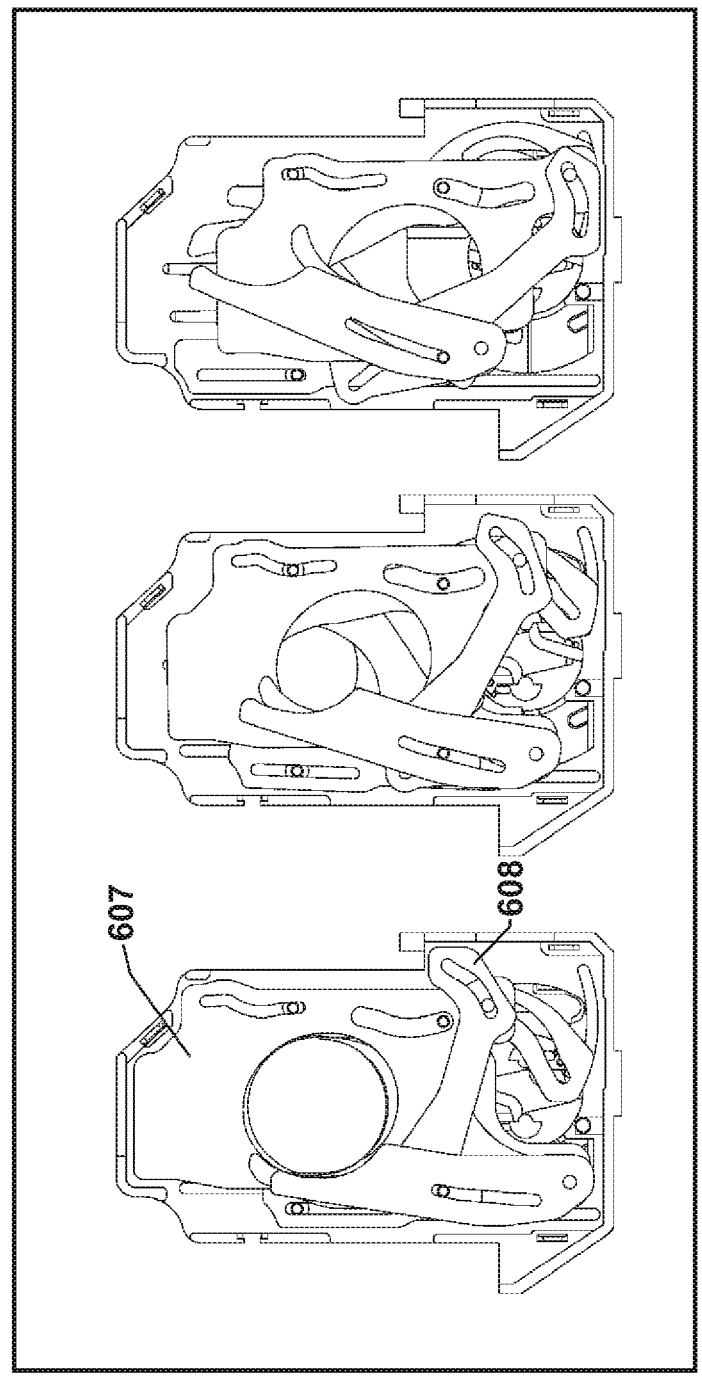

LIGHT AMOUNT ADJUSTING DEVICE AND OPTICAL DEVICE

This application is a continuation of International Patent Application No. PCT/2017/007933 filed on Feb. 28, 2017, and claims priority to Japanese Patent Application No. 2016-072503 filed on Mar. 31, 2016 and Japanese Patent Application No. 2016-150439 filed on Jul. 29, 2016, the entire contents of which are incorporated herein by reference.

TECHNICAL FIELD

The present invention relates to a light amount adjusting device mounted in an optical device such as a camera or an interchangeable lens and also called a diaphragm device or the like.

BACKGROUND ART

The performance of a light amount adjusting device (diaphragm device) mounted in an optical device such as a camera or an interchangeable lens affects the quality of an image captured using the optical device. In particular, the shape (diaphragm opening shape) of a diaphragm opening which is formed by diaphragm blades and through which light actually passes changes the shape of a so-called blur or ghost. That is, when the diaphragm opening shape is almost circular, the shape of a blur or ghost is also circular and, therefore, natural image quality can be obtained. On the other hand, when the diaphragm opening shape is a rectangular or flat shape largely different from a circular shape, the blur or ghost also has the same shape, and unnatural image quality is obtained.

Such a diaphragm opening shape largely different from the circular shape readily occurs when the diaphragm opening is formed by two diaphragm blades. Hence, PTL 1 discloses an iris diaphragm device that drives many diaphragm blades by rotating an annular drive ring around a diaphragm opening and forms a polygonal diaphragm opening shape closer to a circular than a rectangle. In addition, PTL 2 discloses a diaphragm device that forms a polygonal diaphragm opening shape closer to a circular than a rectangle by combining a pair of straight diaphragm blades that slide straight and a pair of swing diaphragm blades that swing (rotate).

CITATION LIST

Patent Literature

PTL 1: Japanese Utility Model Laid-Open No. 2-48928
PTL 2: Japanese Patent Laid-Open No. 2009-115831

SUMMARY OF INVENTION

Technical Problem

In the arrangement of the iris diaphragm device disclosed in PTL 1, however, the drive ring is arranged around the diaphragm opening, and the retracting space for the many diaphragm blades is needed in the whole circumferential direction. For this reason, the device readily becomes bulky in the whole circumferential direction. In addition, the diaphragm device disclosed in PTL 2 can suppress the size in the width direction orthogonal to the straight-ahead direction of the straight diaphragm blades, as compared to the iris diaphragm device. However, as in the iris diaphragm, since the device has an arrangement that drives the pair of straight diaphragm blades and the pair of swing diaphragm blades by rotating an annular plate corresponding to a drive ring arranged around the diaphragm opening, size reduction of the device is limited.

The present invention has been made in consideration of the above-described problem, and has as its object to provide a light amount adjusting device capable of reducing the size of the device while obtaining a satisfactory diaphragm opening shape and an optical device having the same.

Solution to Problem

According to the present invention, there is provided a light amount adjusting device comprising: an opening forming member configured to form an opening portion through which light passes; a blade group configured to move on the opening forming member and form a part of a light passing opening in the opening portion; and a power transmission member arranged outside the opening portion and engaging with the blade group to transmit power, wherein the blade group includes a straight blade configured to move linearly and a swing blade configured to swing from both sides in a straight-ahead operation of the straight blade toward a center of the light passing opening, one of an edge portion of the light passing opening on a side of the power transmission member and an edge portion on a side opposite to the side of the power transmission member is formed by the blade group, and edge portions other than the one of the edge portion of the light passing opening are formed by blades other than the blade group.

According to the present invention, there is also provided a light amount adjusting device comprising: an opening forming member configured to form an opening portion through which light passes; a blade group configured to move on the opening forming member and form a light passing opening in the opening portion; and a power transmission member arranged outside the opening portion and engaging with the blade group to transmit power, wherein the blade group includes a pair of straight blades arranged on both sides of the opening portion to face each other on a straight line that connects the opening portion and the power transmission member and configured to move forward and backward with respect to the opening portion, and a plurality of swing blades configured to swing in an oblique direction with respect to the opening portion on both sides of a moving direction of the pair of straight blades and enter the opening portion, in a process in which one end of the power transmission member engaging with a first blade group included in the blade group approaches the opening portion, and the other end of the power transmission member engaging with a second blade group included in the blade group separates from the opening portion, a first opening edge portion forming a half of the light passing opening on a side of the power transmission member is formed by the first blade group, and a second opening edge portion forming a remaining half of the light passing opening on a side opposite to the side of the power transmission member is formed by the second blade group, and the first blade group includes one straight blade of the pair of straight blades and another first blade pair, the second blade group includes the other straight blade of the pair of straight blades and another second blade pair, and at least one blade pair of the other first blade pair and the other second blade pair is formed by the swing blade.

According to the present invention, there is also provided a light amount adjusting device comprising: an opening forming member configured to form an opening portion through which light passes; a blade group configured to move on the opening forming member and form a light passing opening in the opening portion; and a power transmission member arranged outside the opening portion and engaging with the blade group to transmit power, wherein the blade group includes a pair of straight blades arranged on both sides of the opening portion to face each other on a straight line that connects the opening portion and the power transmission member and configured to move forward and backward with respect to the opening portion, and a plurality of swing blades configured to swing in an oblique direction with respect to the opening portion on both sides of a moving direction of the pair of straight blades and enter the opening portion, in a process in which one end of the power transmission member engaging with a first blade group included in the blade group approaches the opening portion, and the other end of the power transmission member engaging with a second blade group included in the blade group separates from the opening portion, a first opening edge portion forming a portion of the light passing opening on a side of the power transmission member is formed by the first blade group, and a second opening edge portion forming a remaining portion of the light passing opening on a side opposite to the side of the power transmission member is formed by the second blade group, and one of the first blade group and the second blade group includes one straight blade of the pair of straight blades and another blade pair, the other of the first blade group and the second blade group is formed by only the other straight blade of the pair of straight blades, and at least one blade of the other blade pair is formed by the swing blade.

According to the present invention, there is also provided a light amount adjusting device comprising: an opening forming member configured to form an opening portion through which light passes; a blade group configured to move on the opening forming member and form a light passing opening in the opening portion; and a power transmission member arranged outside the opening portion and transmitting a power by driving pins which are arranged respective ends of an arm rotating outside the opening portion and engage with the blade group, wherein the blade group includes a pair of straight blades configured to operate linearly and form one part of the light passing opening which positions at the power transmission member side and another part of the light passing opening which positions opposite to the power transmission member and a plurality of swing blades configured to swing from both sides in a straight-ahead operation of the straight blade toward a center of the light passing opening from same side of the straight blades, the blade group including the pair of straight blades and the plurality of swing blades moves towards the center of the light passing opening such that all of the pair of straight blades and the plurality of swing blades are guided by a single guide pin by a structure that each group of holes formed in each straight blade of the pair of straight blades and each of the plurality of swing blades which swing toward a center of the light passing opening from same side of the each straight blade engages the single driving pin and each group of long holes formed in each straight blade of the pair of straight blades and each of the plurality of swing blades which swing toward a center of the light passing opening from same side of the each straight blade slidably engages a single guide pin arranged on the opening forming member.

Advantageous Effects of Invention

According to the present invention, it is possible to provide a light amount adjusting device capable of reducing the size of the device while obtaining a satisfactory diaphragm opening shape and an optical device having the same.

BRIEF DESCRIPTION OF DRAWINGS

FIG. 21 is a front view showing a change of a diaphragm opening according to the sixth embodiment.

DESCRIPTION OF EMBODIMENTS

Embodiments of the present invention will now be described in detail with reference to the accompanying drawings.

First Embodiment

Figure 1:
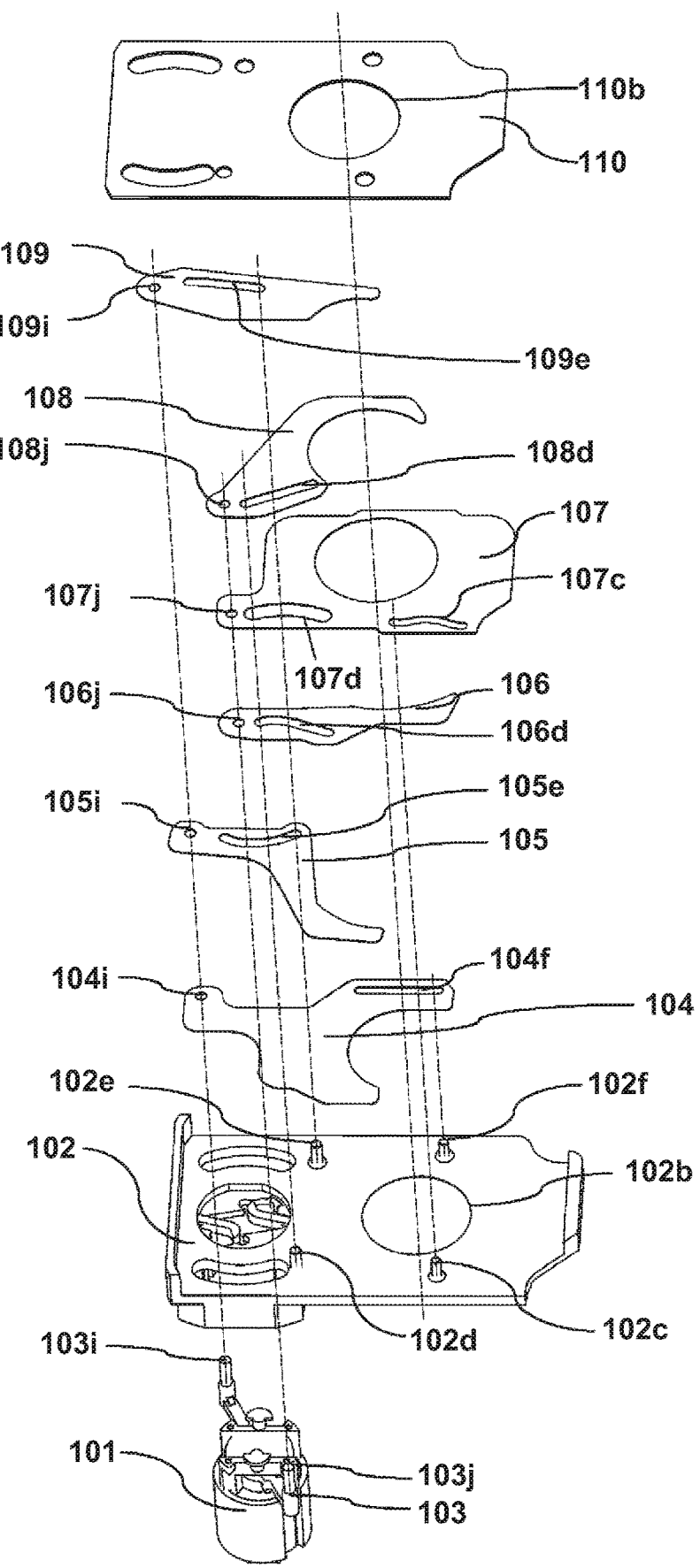
FIG. 1 is an exploded perspective view of a diaphragm device according to the first embodiment of the present invention.
Figure 2:
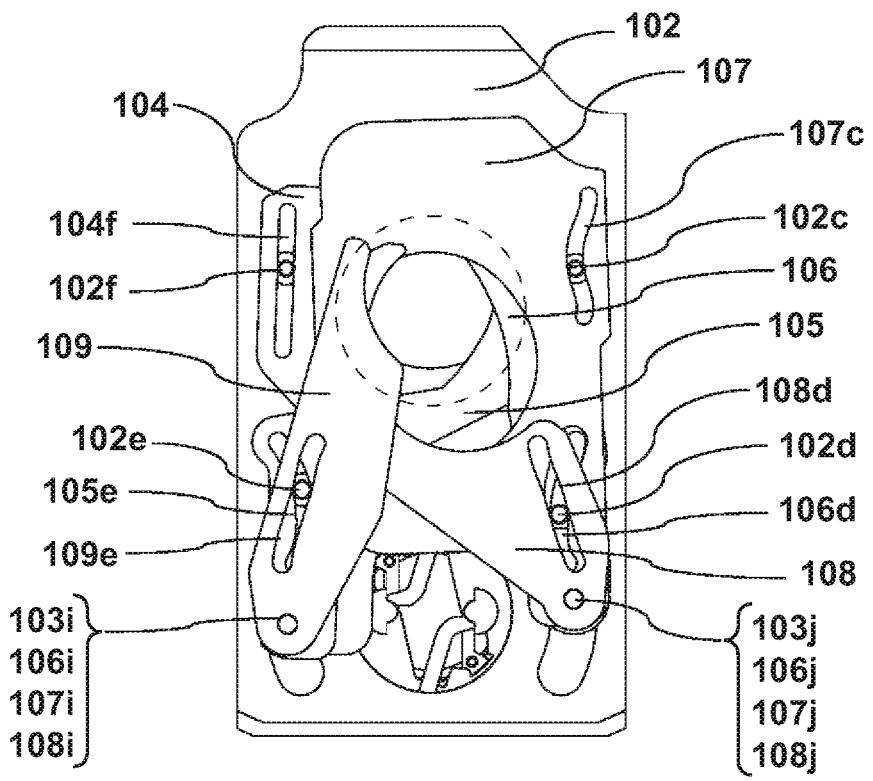
FIG. 2 is a front view of a diaphragm opening according to the first embodiment.
Figure 3:
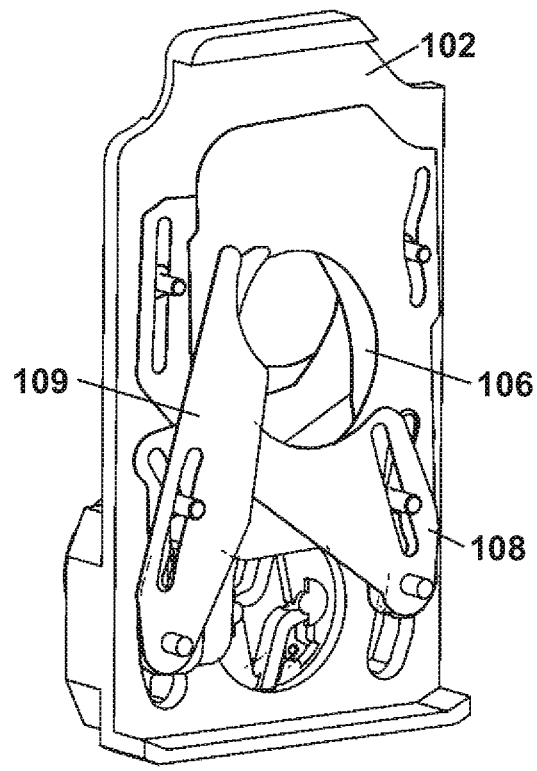
FIG. 3 is a perspective view of the diaphragm opening according to the first embodiment.

FIG. 1 is an exploded perspective view of a diaphragm device that is the first embodiment of a light amount adjusting device according to the present invention. FIG. 2 is a view showing the diaphragm device viewed from a direction (optical axis direction) in which light passes through a diaphragm opening formed by diaphragm blades (blade members) 104 to 109. Note that FIG. 2 shows a state in which a cover 110 shown in FIG. 1 is removed. FIG. 3 is a view showing the diaphragm device in FIG. 2, which is viewed obliquely. Additionally, in these drawings, the vertical direction of the diaphragm device, which is the longitudinal direction, corresponds to the "direction orthogonal to the light passing direction", and this direction will be referred to as an optical axis orthogonal direction in the following explanation. In addition, the left-right direction of the diaphragm device in these drawings will be referred to as a width direction hereinafter.

Referring to FIGS. 1 to 3, a fixed opening 102b that passes light is formed in a base plate 102 serving as an opening forming member. The base plate 102 is produced by press working, resin molding, or the like. On the outer surface (one surface in the optical axis direction) of the base plate 102, a diaphragm driving unit 101 is attached to a position (one-end side) apart from the fixed opening 102b in the downward direction. The diaphragm driving unit 101 is an electromagnetic drive motor (driving source) formed by, for example, a rotor magnet (not shown), a drive lever 103 serving as a power transmission member that rotates integrally with the rotor magnet, and a coil (not shown) that generates a magnetic force to rotate the rotor magnet when energized. The diaphragm driving unit 101 may be a stepping motor.

Blade drive pins 103i and 103j of the drive lever 103 extend through the base plate 102 and project to the inner surface side of the base plate 102. The drive lever 103 pivots within a predetermined angle range about a shaft located apart from the fixed opening 102b in the downward direction. The drive lever 103 is produced by resin molding or the like.

The drive lever 103 separately includes the blade drive pins 103i and 103j each serving as a transmission portion configured to drive the diaphragm blades 104 to 109 at the distal ends on both the left and right sides across the position of the pivot center. The blade drive pin 103i engages with three diaphragm blades, that is, the diaphragm blade 104 that is one blade of a pair of straight blades, and the diaphragm blade 105 and the diaphragm blade 109 which form a first diaphragm blade pair. The blade drive pin 103j engages with three diaphragm blades, that is, the diaphragm blade 107 that is the other blade of the pair of straight blades, and the diaphragm blade 106 and the diaphragm blade 108 which form a second diaphragm blade pair.

Note that the drive lever 103 may be attached and arranged inside the base plate 102 after the rotation center shaft of the diaphragm driving unit 101 is extended through the base plate 102.

As described above, in this embodiment, the two blade drive pins 103i and 103j are provided on one drive lever 103 attached to the diaphragm driving unit 101, and the diaphragm blades 104, 105, and 109 are engaged with the same (common) blade drive pin 103i. In addition, the diaphragm blades 106, 107, and 108 are engaged with the same (common) other blade drive pin 103j. The drive lever 103 on which three diaphragm blades engage with each of the plurality of (two) blade drive pins 103i and 103j is made to pivot, thereby moving the pair of straight blades (the diaphragm blade 104 and the diaphragm blade 107) in the optical axis orthogonal direction so as to sandwich the fixed opening 102b. Simultaneously, the first diaphragm blade pair (the diaphragm blade 105 and the diaphragm blade 109) is obliquely moved with respect to the fixed opening 102b (moved into the fixed opening 102b) from a direction crossing the straight-ahead direction of the pair of straight blades. Furthermore, simultaneously, the second diaphragm blade pair (the diaphragm blade 106 and the diaphragm blade 108) is obliquely moved with respect to the fixed opening 102b (moved into the fixed opening 102b) from a direction crossing the straight-ahead direction of the pair of straight blades. A polygonal diaphragm opening close to a circle is formed by the six diaphragm blades 104 to 109, and the size (diameter) of the diaphragm opening is changed.

When the above-described arrangement is employed, a diaphragm opening with a satisfactory shape can be formed while ensuring advantage in reducing the size of the diaphragm device, as compared to a case in which a drive ring (annular plate) arranged around a diaphragm opening is rotated, and straight diaphragm blades or rotational diaphragm blades are driven by the drive shaft portions of the drive ring, which are different from each other, as in PTL 2.

Note that "the diaphragm blades 104 and 107 as the pair of straight blades move in the optical axis orthogonal direction" includes a case (first embodiment) in which the diaphragm blades 104 and 107 move in the optical axis orthogonal direction while swinging (rotating) or shifting in the width direction and a case (second embodiment to be described later) in which the diaphragm blades 104 and 107 move straight (translate) in the optical axis orthogonal direction.

The cover 110 is a cover attached to the base plate 102 to form, with the base plate 102, a space in which the diaphragm blades 104 to 109 move. The cover 110 includes an opening 110b corresponding to the fixed opening 102b formed in the base plate 102. The cover 110 is produced by press working, resin molding, or the like. A rail (not shown) is formed on the inner surface (the surface on the base plate side) of the cover 110 to reduce the sliding resistance to the diaphragm blades 104 to 109.

The diaphragm device according to this embodiment can change the diaphragm opening diameter by making the drive lever 103 pivot, as described above, and can also completely close (fully close) the diaphragm opening. For this reason, the diaphragm device according to this embodiment can also perform a shutter operation. That is, the diaphragm device according to this embodiment can also be used as a shutter device.

Each diaphragm blade will be described below in more detail. The diaphragm blades 104 to 109 are produced by press working, resin molding, or the like.

Figure 4:
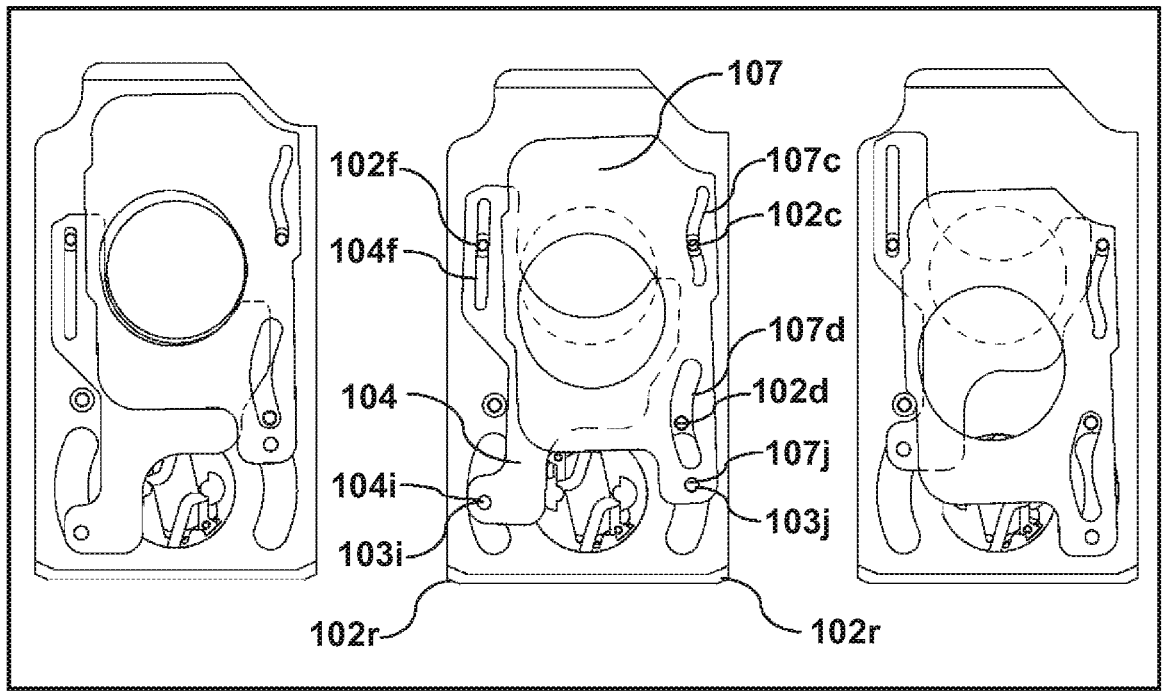
FIG. 4 is a front view of a pair of straight blades according to the first embodiment.

FIG. 4 is a view showing a pair of straight blades. The diaphragm blade 104 and the diaphragm blade 107 are blades that form the pair of straight blades, and move almost linearly (in an almost linear pattern) in a direction orthogonal to the light passing opening to sandwich the fixed opening 102b. Each diaphragm blade will be described below in detail.

The diaphragm blade 104 (one blade of the pair of straight blades) rotatably engages with the blade drive pin 103i of the drive lever 103 in a circular drive hole portion 104i that is the first engaging portion. In addition, a guide pin 102f serving as a guide portion (guide shaft portion) formed on the base plate 102 slidably engages with a guide long hole portion 104f serving as the second engaging portion formed in the diaphragm blade 104 (one blade of the pair of straight blades) to extend in the optical axis orthogonal direction.

When the drive lever 103 pivots within the above-described predetermined angle range, the diaphragm blade 104 (one blade of the pair of straight blades) receives the driving force from the blade drive pin 103i in the drive hole portion 104i, rotatably moves about the blade drive pin 103i engaging with the drive hole portion 104i, and is driven in the optical axis orthogonal direction while the guide long hole portion 104f is guided by the guide pin 102f.

At this time, since the blade drive pin 103i moves to draw a circular arc about the diaphragm driving unit 101, the diaphragm blade 104 (one blade of the pair of straight blades) swings about the guide pin 102f in the width direction while being guided by the guide pin 102f in the optical axis orthogonal direction. That is, when the diaphragm blade 104 (one blade of the pair of straight blades) reaches the lower end of the base plate 102 and retracts from the fixed opening 102b, the drive hole portion 104i of the diaphragm blade 104 (one blade of the pair of straight blades) swings so as to be pulled in a direction to move close to a line that connects the center of the fixed opening 102b and the rotation center axis of the drive lever 103. For this reason, in this embodiment, a corner portion 102r on the left side of the base plate 102 shown in FIG. 4 can be formed into a circular arc shape recessed inward as compared to a case in which the diaphragm blade 104 (one blade of the pair of straight blades) simply moves straight without swinging, and the base plate 102 can thus be made small.

In addition, to simply move the diaphragm blade 104 (one blade of the pair of straight blades) straight without swinging, it is necessary to form the drive hole portion 104i into a long hole long in the width direction of the diaphragm device, provide two guide pins 102f on the base plate 102 to enable a straight movement, and provide two guide long hole portions 104f formed on the diaphragm blade 104 (one blade of the pair of straight blades). However, since the diaphragm blade 104 is driven in the optical axis orthogonal direction while swinging in this embodiment, the number of guide pins 102f provided on the base plate 102 can be one. In addition, the number of guide long hole portions 104f formed on the diaphragm blade 104 (one blade of the pair of straight blades) can also be one. As a result, the diaphragm blade 104 (one blade of the pair of straight blades) can be made smaller and, accordingly, the base plate 102 can be made smaller. Hence, the diaphragm device can be made compact, and an optical device such as a camera or an interchangeable lens in which the diaphragm device is mounted can also be made compact.

The speed of the swing of the diaphragm blade 104 (one blade of the pair of straight blades) about the guide pin 102f can be adjusted by forming the guide long hole portion 104f into a cam groove shape. Additionally, in this embodiment, the shape of the diaphragm opening to obtain a satisfactory diaphragm opening shape can also be corrected by adjusting the cam groove shape of the guide long hole portion 104f, as compared to a case in which the diaphragm blade 104 (one blade of the pair of straight blades) simply moves straight without swinging.

The diaphragm blade 107 (the other blade of the pair of straight blades) rotatably engages with the blade drive pin 103j of the drive lever 103 in a circular drive hole portion 107j that is the third engaging portion. In addition, a guide pin 102c serving as a guide portion (guide portion) formed on the base plate 102 slidably engages with (is inserted into) a guide long hole portion 107c serving as the fourth engaging portion formed in the diaphragm blade 107 (the other blade of the pair of straight blades) to extend in the optical axis orthogonal direction.

When the drive lever 103 pivots within the above-described predetermined angle range, the diaphragm blade 107 (the other blade of the pair of straight blades) receives the driving force from the blade drive pin 103j in the drive hole portion 107j, rotatably moves about the blade drive pin 103j engaging with the drive hole portion 107j, and is driven in the optical axis orthogonal direction while the guide long hole portion 107c is guided by the guide pin 102c.

At this time, since the blade drive pin 103j moves to draw a circular arc about the diaphragm driving unit 101, the diaphragm blade 107 (the other blade of the pair of straight blades) swings about the guide pin 102c in the width direction while being guided by the guide pin 102c in the optical axis orthogonal direction. That is, when the diaphragm blade 107 (the other blade of the pair of straight blades) reaches the lower end of the base plate 102 and enters the fixed opening 102b, the drive hole portion 107j of the diaphragm blade 107 (the other blade of the pair of straight blades) swings so as to be pulled in a direction to move close to a line that connects the center of the fixed opening 102b and the rotation center axis of the drive lever 103. For this reason, in this embodiment, the corner portion 102r on the right side of the base plate 102 shown in FIG. 4 can be formed into a circular arc shape recessed inward as compared to a case in which the diaphragm blade 107 (the other blade of the pair of straight blades) simply moves straight without swinging, and the base plate 102 can thus be made small.

In addition, to simply move the diaphragm blade 107 (the other blade of the pair of straight blades) straight without swinging, it is necessary to form the drive hole portion 107*j* into a long hole long in the width direction of the diaphragm device, provide two guide pins 102*c* on the base plate 102 to enable a straight movement, and provide two guide long hole portions 107*c* formed on the diaphragm blade 107 (the other blade of the pair of straight blades). However, since the diaphragm blade 107 is driven in the optical axis orthogonal direction while swinging in this embodiment, the number of guide pins 102*c* provided on the base plate 102 can be one. In addition, the number of guide long hole portions 107*c* formed on the diaphragm blade 107 (the other blade of the pair of straight blades) can also be one. As a result, the diaphragm blade 107 (the other blade of the pair of straight blades) can be made smaller and, accordingly, the base plate 102 can be made smaller. Hence, the diaphragm device can be made compact, and an optical device such as a camera or an interchangeable lens in which the diaphragm device is mounted can also be made compact.

The speed of the swing of the diaphragm blade 107 (the other blade of the pair of straight blades) about the guide pin 102*c* can be adjusted by forming the guide long hole portion 107*c* into a cam groove shape. Additionally, in this embodiment, the shape of the diaphragm opening to obtain a satisfactory diaphragm opening shape can also be corrected by adjusting the cam groove shape of the guide long hole portion 107*c*, as compared to a case in which the diaphragm blade 107 (the other blade of the pair of straight blades) simply moves straight without swinging.

In addition, a long hole portion 107*d* configured to avoid interference with a guide pin 102*d* is formed in the diaphragm blade 107. When the guide pin 102*d* extends through the long hole portion 107*d*, the shape of the diaphragm blade 107 can be formed into a shape capable of ensuring the strength and the guide pin 102*d* can efficiently be arranged on the base plate 102. Furthermore, when the long hole portion 107*d* is formed in the diaphragm blade 107, the diaphragm blade 107 can be made lightweight, and this is effective for the shutter operation.

Figure 5:
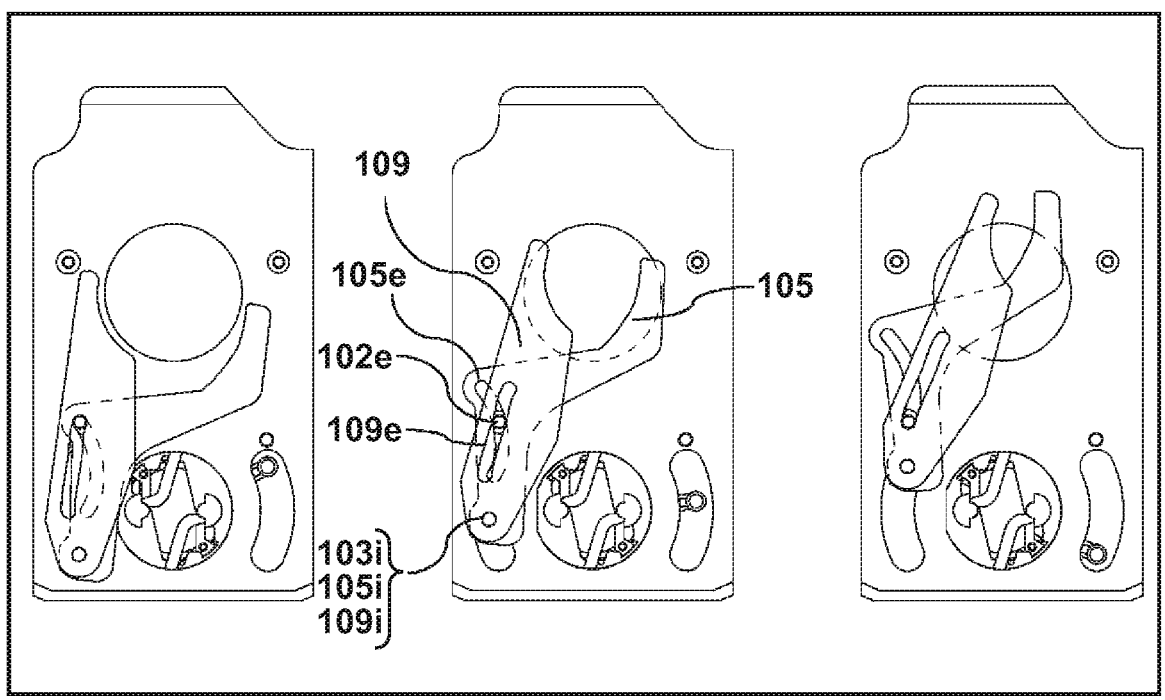
FIG. 5 is a front view of a first blade pair according to the first embodiment.

FIG. 5 is a view showing the first diaphragm blade pair. The diaphragm blade 105 and the diaphragm blade 109 form the first diaphragm blade pair, and their one-end sides overlap each other in the optical axis direction on the blade drive pin 103*i* of the drive lever 103. The diaphragm blades move in an oblique direction with respect to the fixed opening 102*b* from a direction crossing the straight-ahead moving direction of the pair of straight blades. Each diaphragm blade will be described below in detail.

The diaphragm blade 105 (one blade of the first diaphragm blade pair) rotatably engages with the blade drive pin 103*i* of the drive lever 103 in a circular drive hole portion 105*i* that is the first engaging portion. In addition, a guide pin 102*e* serving as a guide portion (guide shaft portion) formed on the base plate 102 slidably engages with a guide long hole portion 105*e* serving as the fifth engaging portion formed in the diaphragm blade 105 (one blade of the first diaphragm blade pair) to extend in the optical axis orthogonal direction.

When the drive lever 103 pivots within the above-described predetermined angle range, the diaphragm blade 105 (one blade of the first diaphragm blade pair) receives the driving force from the blade drive pin 103*i* in the drive hole portion 105*i*, and rotatably moves about the blade drive pin 103*i* engaging with the drive hole portion 105*i*. Then, the diaphragm blade 105 moves obliquely with respect to the fixed opening 102*b* from a direction (width direction) crossing the straight-ahead direction of the pair of straight blades while the guide long hole portion 105*e* is guided by the guide pin 102*e*.

The speed of the swing of the diaphragm blade 105 (one blade of the first diaphragm blade pair) about the guide pin 102*e* can be adjusted by forming the guide long hole portion 105*e* into a cam groove shape. Additionally, in this embodiment, the shape of the diaphragm opening to obtain a satisfactory diaphragm opening shape can also be corrected by adjusting the cam groove shape of the guide long hole portion 105*e*, as compared to a case in which the diaphragm blade 105 (one blade of the first diaphragm blade pair) simply moves straight without swinging.

The diaphragm blade 109 (the other blade of the first diaphragm blade pair) rotatably engages with the blade drive pin 103*i* of the drive lever 103 in a circular drive hole portion 109*i* that is the first engaging portion. In addition, the guide pin 102*e* serving as a guide portion (guide shaft portion) formed on the base plate 102 slidably engages with a guide long hole portion 109*e* serving as the fifth engaging portion formed in the diaphragm blade 109 (the other blade of the first diaphragm blade pair) to extend in the optical axis orthogonal direction.

When the drive lever 103 pivots within the above-described predetermined angle range, the diaphragm blade 109 (the other blade of the first diaphragm blade pair) receives the driving force from the blade drive pin 103*i* in the drive hole portion 109*i*, and rotatably moves about the blade drive pin 103*i* engaging with the drive hole portion 109*i*. Then, the diaphragm blade 109 moves obliquely with respect to the fixed opening 102*b* from a direction crossing the straight-ahead direction of the pair of straight blades while the guide long hole portion 109*e* is guided by the guide pin 102*e*.

The speed of the swing of the diaphragm blade 109 (the other blade of the first diaphragm blade pair) about the guide pin 102*e* can be adjusted by forming the guide long hole portion 109*e* into a cam groove shape. Additionally, in this embodiment, the shape of the diaphragm opening to obtain a satisfactory diaphragm opening shape can also be corrected by adjusting the cam groove shape of the guide long hole portion 109*e*, as compared to a case in which the diaphragm blade 109 (the other blade of the first diaphragm blade pair) simply moves straight without swinging.

The blades of the first diaphragm blade pair engage with the same blade drive pin 103*i* with the drive hole portions 105*i* and 109*i* overlapping each other, and are given the driving force. In addition, they are guided by the same guide pin 102*e*. When the shapes of the guide long hole portion 105*e* and the guide long hole portion 109*e* are changed, the blades of the first diaphragm blade pair enter the fixed opening 102*b* obliquely from different directions to sandwich the fixed opening 102*b* with respect to the straight-ahead direction of the pair of straight blades.

Figure 6:
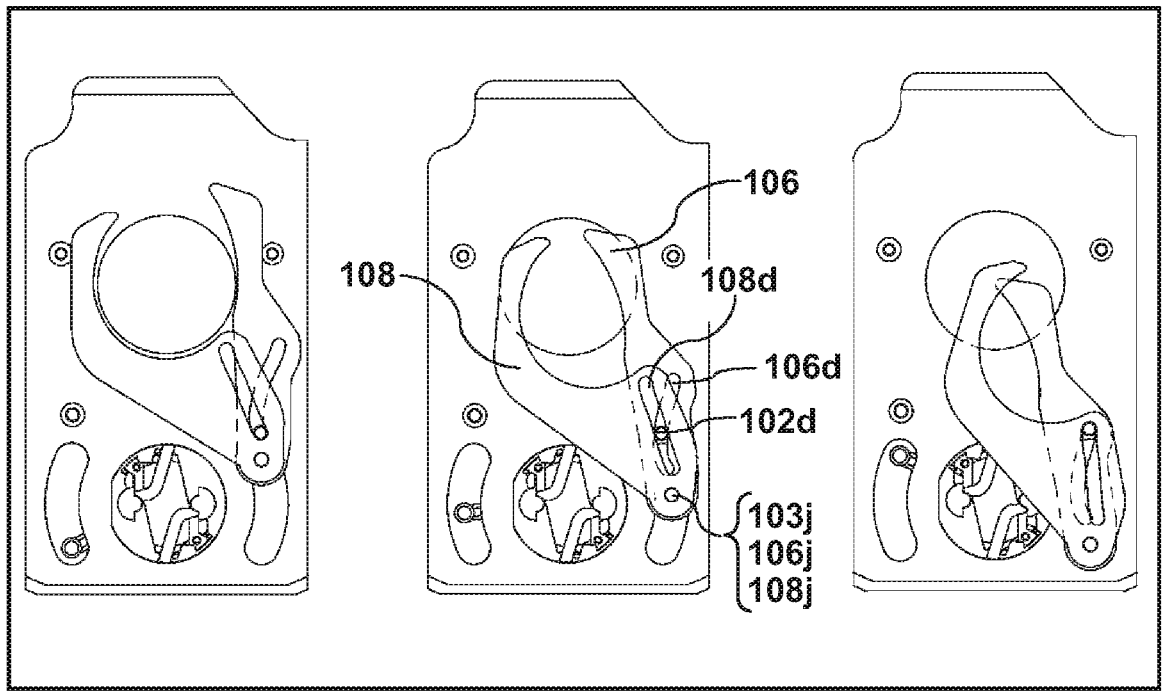
FIG. 6 is a front view of a second blade pair according to the first embodiment.

FIG. 6 is a view showing the second diaphragm blade pair. The diaphragm blade 106 and the diaphragm blade 108 form the second diaphragm blade pair, and their one-end sides overlap each other in the optical axis direction on the blade drive pin 103*j* of the drive lever 103. The diaphragm blades move in an oblique direction with respect to the fixed opening 102*b* from a direction crossing the straight-ahead moving direction of the pair of straight blades. Each diaphragm blade will be described below in detail.

The diaphragm blade 106 (one blade of the second diaphragm blade pair) rotatably engages with the blade drive pin 103j of the drive lever 103 in a circular drive hole portion 106j that is the third engaging portion. In addition, the guide pin 102d serving as a guide portion (guide shaft portion) formed on the base plate 102 slidably engages with a guide long hole portion 106d serving as the fifth engaging portion formed in the diaphragm blade 106 (one blade of the second diaphragm blade pair) to extend in the optical axis orthogonal direction.

When the drive lever 103 pivots within the above-described predetermined angle range, the diaphragm blade 106 (one blade of the second diaphragm blade pair) receives the driving force from the blade drive pin 103j in the drive hole portion 106j, and rotatably moves about the blade drive pin 103j engaging with the drive hole portion 106j. Then, the diaphragm blade 106 moves obliquely with respect to the fixed opening 102b from a direction crossing the straight-ahead direction of the pair of straight blades while the guide long hole portion 106d is guided by the guide pin 102d.

The speed of the swing of the diaphragm blade 106 (one blade of the second diaphragm blade pair) about the guide pin 102d can be adjusted by forming the guide long hole portion 106d into a cam groove shape. Additionally, in this embodiment, the shape of the diaphragm opening to obtain a satisfactory diaphragm opening shape can also be corrected by adjusting the cam groove shape of the guide long hole portion 106d, as compared to a case in which the diaphragm blade 106 (one blade of the second diaphragm blade pair) simply moves straight without swinging.

The diaphragm blade 108 (the other blade of the second diaphragm blade pair) rotatably engages with the blade drive pin 103j of the drive lever 103 in a circular drive hole portion 108j that is the third engaging portion. In addition, the guide pin 102d serving as a guide portion (guide shaft portion) formed on the base plate 102 slidably engages with a guide long hole portion 108d serving as the sixth engaging portion formed in the diaphragm blade 108 (the other blade of the second diaphragm blade pair) to extend in the optical axis orthogonal direction.

When the drive lever 103 pivots within the above-described predetermined angle range, the diaphragm blade 108 (the other blade of the second diaphragm blade pair) receives the driving force from the blade drive pin 103j in the drive hole portion 108j, and rotatably moves about the blade drive pin 103j engaging with the drive hole portion 108j. Then, the diaphragm blade 108 moves obliquely with respect to the fixed opening 102b from a direction crossing the straight-ahead direction of the pair of straight blades while the guide long hole portion 108d is guided by the guide pin 102d.

The speed of the swing of the diaphragm blade 108 (the other blade of the second diaphragm blade pair) about the guide pin 102d can be adjusted by forming the guide long hole portion 108d into a cam groove shape. Additionally, in this embodiment, the shape of the diaphragm opening to obtain a satisfactory diaphragm opening shape can also be corrected by adjusting the cam groove shape of the guide long hole portion 108d, as compared to a case in which the diaphragm blade 108 (the other blade of the second diaphragm blade pair) simply moves straight without swinging.

The blades of the second diaphragm blade pair engage with the same blade drive pin 103j with the drive hole portions 106j and 108j overlapping each other, and are given the driving force. In addition, they are guided by the same guide pin 102d. When the shapes of the guide long hole portion 106d and the guide long hole portion 108d are changed, the blades of the second diaphragm blade pair enter the fixed opening 102b obliquely from different directions to sandwich the fixed opening 102b with respect to the straight-ahead direction of the pair of straight blades.

Figure 7:
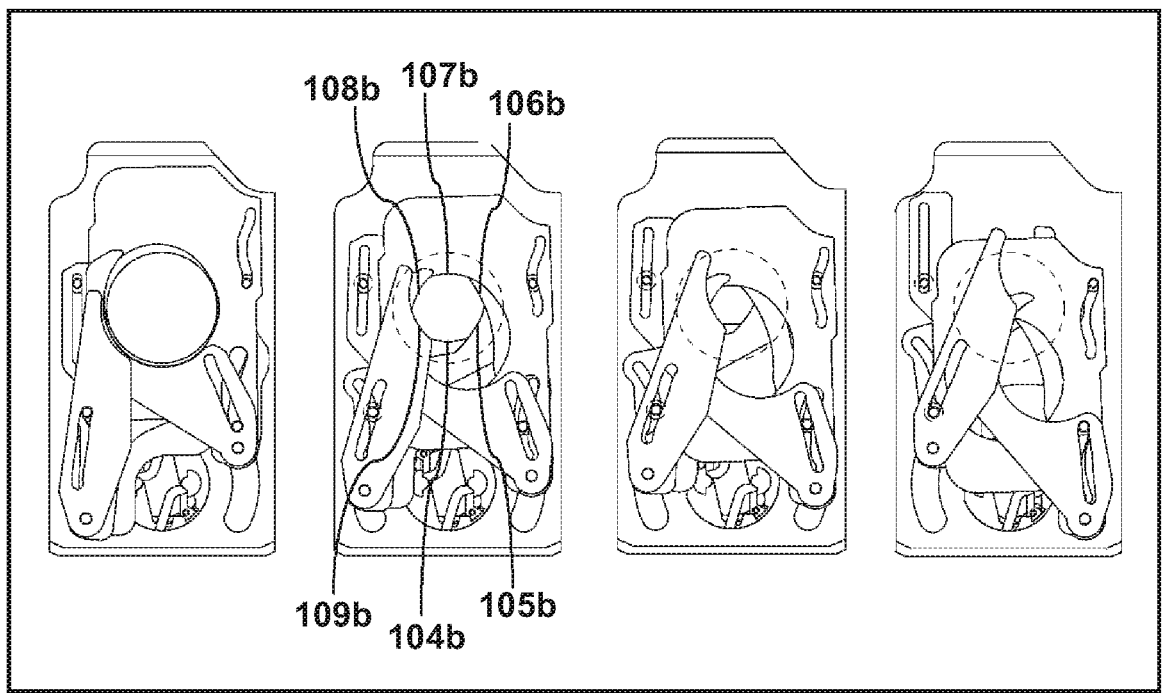
FIG. 7 is a front view showing a change of the diaphragm opening according to the first embodiment.

The movements of the diaphragm blades 104 to 109 with respect to the pivot position of the drive lever 103 can be adjusted by the shapes of the guide long hole portions 104f, 105e, 106d, 107c, 108d, and 109e formed in the blades. Accordingly, as shown in FIG. 7, a diaphragm opening close to a circle or with an almost regular hexagonal shape can be formed by opening forming edge portions 104b, 105b, 106b, 107b, 108b, and 109b of the diaphragm blades 104 to 109 in each diaphragm state from a full-aperture state (left view) to a stopped-down-aperture state (right view).

The reason why the first embodiment is effective for size reduction and excellent in durability and enables thinning will be described here.

In the first embodiment, all the drive hole portions of the diaphragm blades engaging with the drive lever 103 are round holes. The width can be suppressed as compared to a case in which the drive hole portions are long holes. For this reason, in the first embodiment, the width does not change in the whole area in the longitudinal direction. The diaphragm blades can be laid out without projecting on the periphery of the drive lever 103. Since the unevenness of the parts can be reduced, the parts can be simplified, resulting in low cost and high quality. In addition, when the diaphragm device is made compact, it can easily be combined with a lens barrel or a camera, resulting in an improved assembling property.

In addition, when the drive hole portions of the diaphragm blades engaging with the drive lever 103 are formed into round holes, the durability improves. The first embodiment can be used not only as an action of slowly opening/closing the diaphragm blades and adjusting the light amount but also as a shutter function. In the shutter operation, the drive lever 103 rotates at a high speed in a direction in which the blades are closed. For this reason, the drive hole portions of the diaphragm blades receive a large force necessary to achieve a high shutter speed from the blade drive pins 103i and 103j of the drive lever 103. In addition, because of the high-speed shutter action, the drive lever 103 collides against a stopper (not shown) of the base plate 102 and rebounds. The drive hole portions of the diaphragm blades receive the large force at the time of rebound of the drive lever 103 as well. Since the drive lever 103 abruptly rebounds in a direction in which the blades open in a state in which the diaphragm blades are moving in the direction in which they are closed, a large load is applied to the drive hole portions of the diaphragm blades. When the drive hole portions are long holes, they are pulled and deformed by the drive lever 103. For this reason, when the drive hole portions are long holes, the durability count is limited. If the drive hole portions are round holes, the drive hole portions receive the force from the drive lever 103, but the holes are not distorted and, therefore, the diaphragm blades are hard to deform. Hence, the durability of the diaphragm blades is largely improved. All the drive hole portions are preferably formed into round holes, as in this embodiment. In addition, at least one drive hole portion formed as a round hole engaging with the blade drive pin preferably exists. Since the diaphragm blades overlap at the engaging portions with the blade drive pins, the diaphragm blades of the drive hole portions formed as round holes can suppress the deformation of the long hole engaging portions of the other diaphragm blades.

As described above, in the first embodiment, the durability of the diaphragm blades is largely improved. For this reason, in the first embodiment, the thickness of the diaphragm blade can be decreased. As the problem of the conventional iris diaphragm, the device becomes thick because a number of diaphragm blades are overlaid to form a circular diaphragm opening, and there is a need to ensure durability. In the first embodiment, all the drive hole portions of the diaphragm blades, which directly receive the force from the drive lever 103, are round holes and are hardly deformed. For this reason, the thickness of the diaphragm blades can be decreased, and this is effective for thinning of the device.

As described above, the diaphragm device according to this embodiment moves each diaphragm blade by driving one drive lever 103 without using a part such as a drive ring that rotates around the diaphragm opening. It is therefore possible to make the diaphragm device compact in the longitudinal direction and the width direction and also decrease the thickness in the optical axis direction.

Note that in this embodiment, a case in which hole portions or groove portions are formed in the diaphragm blades 104 to 109, and the pins formed on the drive lever 103 or the base plate 102 are engaged with (inserted into) these hole portions or groove portions has been described. However, an arrangement in which the pins are provided on the diaphragm blades and inserted into hole portions or groove portions formed in the drive lever or the base plate can also be employed.

Second Embodiment

Figure 8:
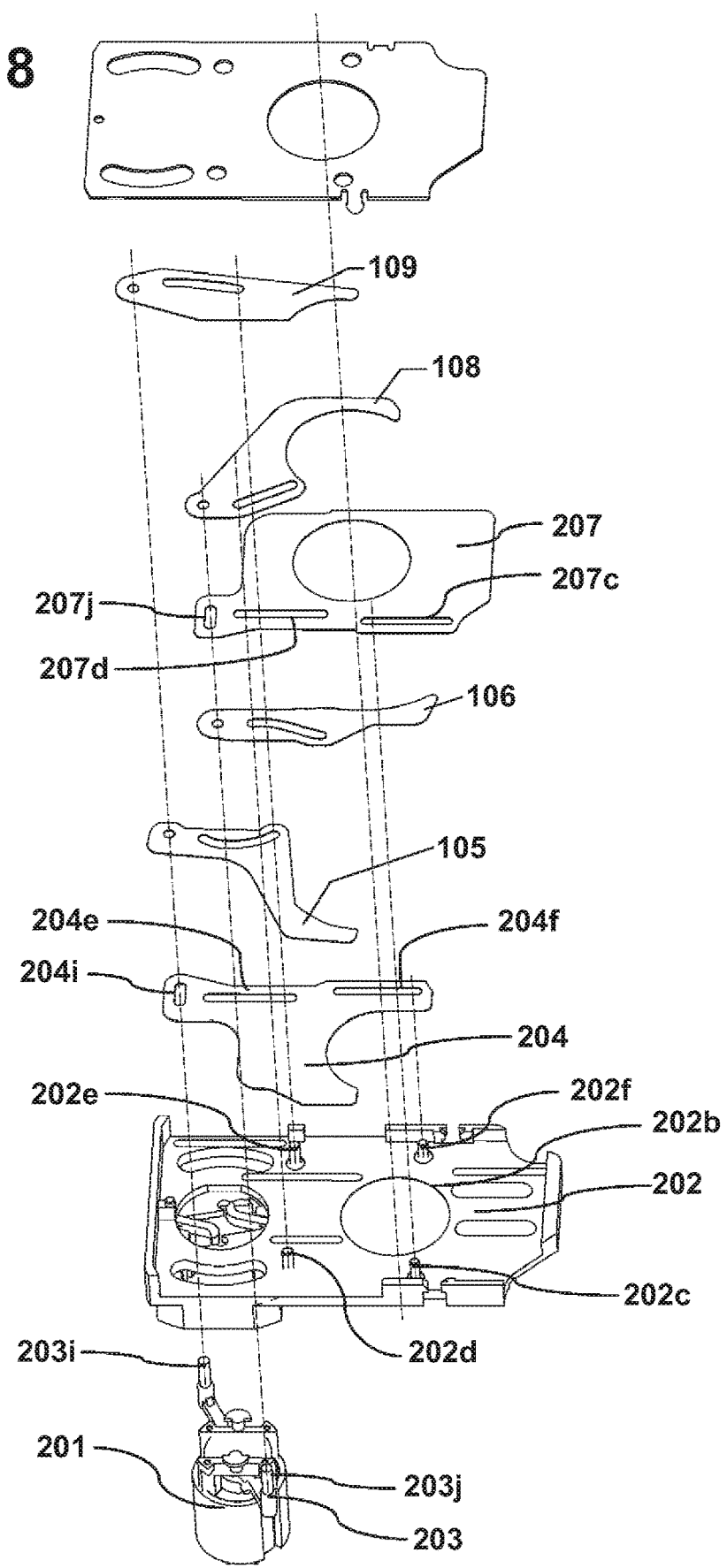
FIG. 8 is an exploded perspective view of a diaphragm device according to the second embodiment.
Figure 9:
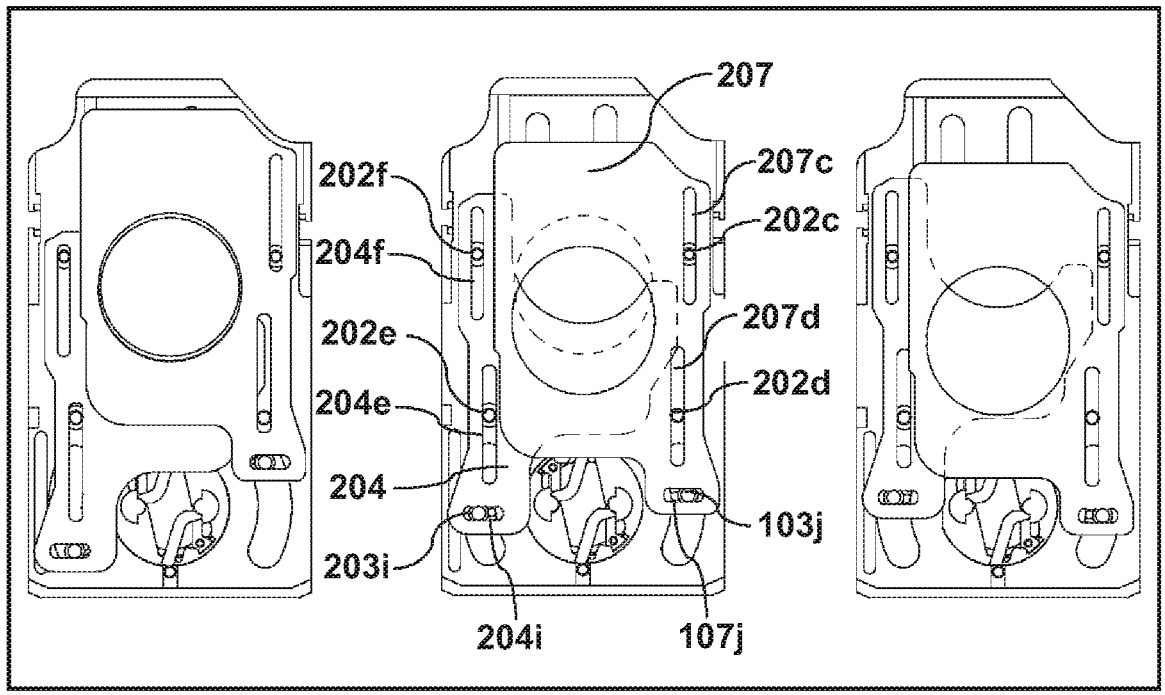
FIG. 9 is a front view of a pair of straight blades according to the second embodiment.

FIG. 8 is an exploded perspective view of a diaphragm device that is the second embodiment of a light amount adjusting device according to the present invention. FIG. 9 is a front view of a pair of straight blades according to the second embodiment.

A diaphragm blade 204 and a diaphragm blade 207 form a pair of straight blades and move linearly in a direction orthogonal to a light passing opening to sandwich a fixed opening 202b of a base plate 202.

In the diaphragm blade 204, a long hole 204i engages with a blade drive pin 203i of a drive lever 203, a long hole 204e engages with a guide pin 202e of the base plate 202, and a long hole 204f engages with a guide pin 202f of the base plate. When the drive lever 203 is made to pivot, the diaphragm blade 204 receives a force from the blade drive pin 203i and actuates. The diaphragm blade 204 linearly moves toward the fixed opening 202b because its moving direction is guided by the two guide pins 202e and 202f.

In the diaphragm blade 207, a long hole 207j engages with a blade drive pin 203j of the drive lever 203, a long hole 207c engages with a guide pin 202c of the base plate 202, and a long hole 207d engages with a guide pin 202d of the base plate 202. When the drive lever 203 is made to pivot, the diaphragm blade 207 receives a force from the blade drive pin 203j and actuates. The diaphragm blade 207 linearly moves toward the fixed opening 202b because its moving direction is guided by the two guide pins 202c and 202d.

Figure 10:
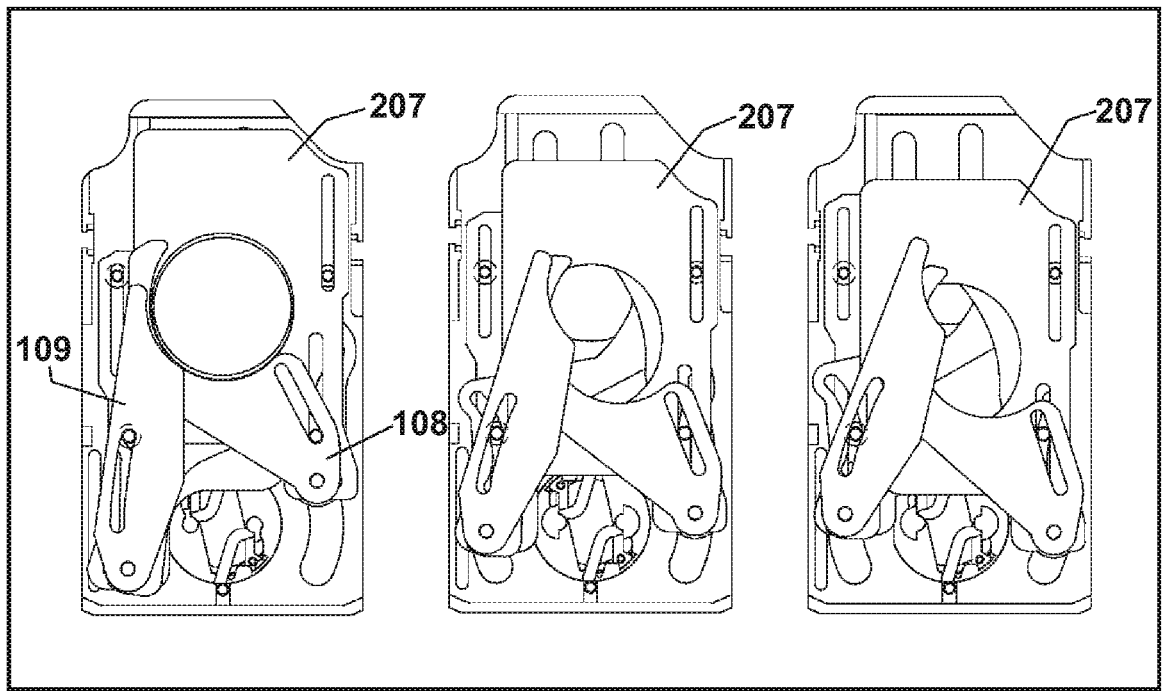
FIG. 10 is a front view showing a change of a diaphragm opening according to the second embodiment.
Figure 11A:
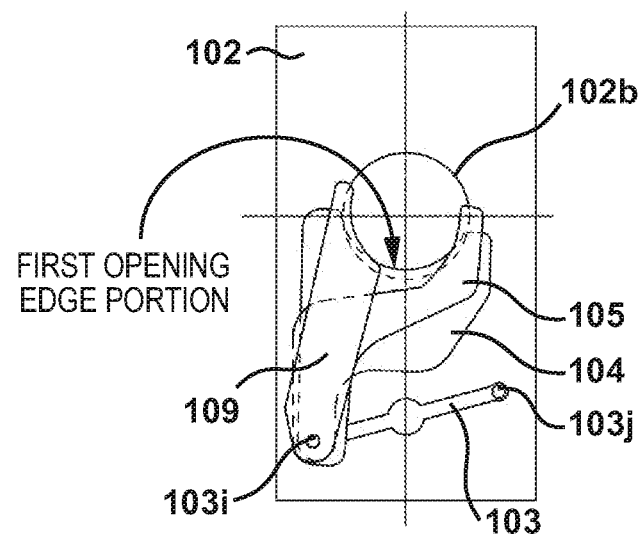
FIG. 11A is a view showing an overall arrangement according to the first and second embodiments.
Figure 11B:
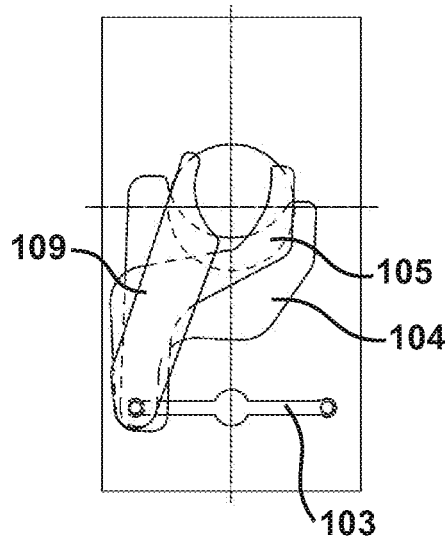
FIG. 11B is a view showing an overall arrangement according to the first and second embodiments.
Figure 11C:
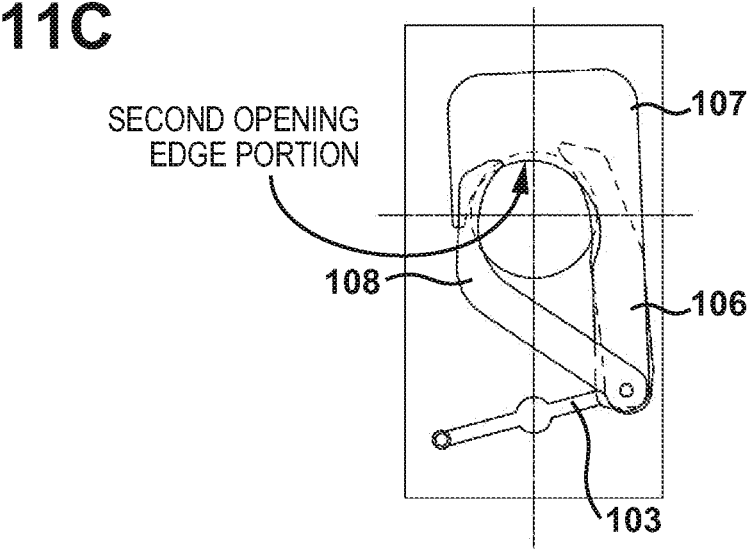
FIG. 11C is a view showing an overall arrangement according to the first and second embodiments.
Figure 11D:
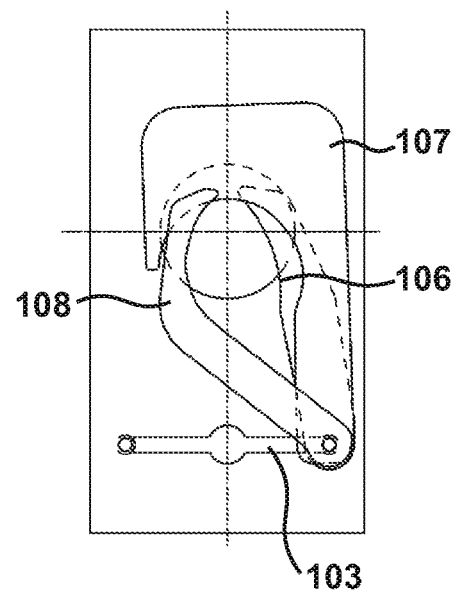
FIG. 11D is a view showing an overall arrangement according to the first and second embodiments.
Figure 11E:
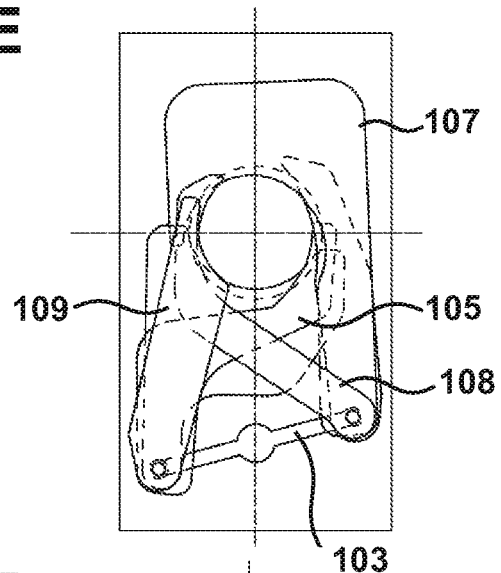
FIG. 11E is a view showing an overall arrangement according to the first and second embodiments.
Figure 11F:
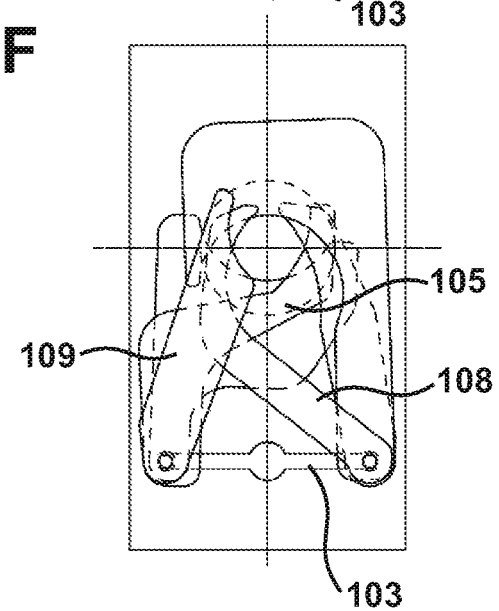
FIG. 11F is a view showing an overall arrangement according to the first and second embodiments.

A first diaphragm blade pair and a second diaphragm blade pair are the same as in the first embodiment. In the second embodiment, as shown in FIG. 10, a diaphragm opening close to a circle or with an almost regular hexagonal shape can be formed in each diaphragm state from a full-aperture state (left view) to a stopped-down-aperture state (right view).

Summary of First and Second Embodiments

In the summary of the concept of the first and second embodiments, a "swing blade" means a diaphragm blade that makes a motion to swing as a whole when the blade drive pin 103i serving as the rotation center moves, like the diaphragm blade 105 and the diaphragm blade 109 shown in FIG. 1. In addition, a "pivot blade" means a diaphragm blade for which a rotation center pin 302d or 302e serving as the rotation center is erected and fixed and which makes a motion to pivot about the fixed center, like a diaphragm blade 306 and a diaphragm blade 308 shown in FIG. 12 to be described later.

The concept of the first and second embodiments can be expressed as follows with reference to FIGS. 11A to 11F as well. Note that the concept will be described below by referring to the reference numerals in FIG. 1 showing the first embodiment.

(a) A light amount adjusting device includes an opening forming member (102) configured to form an opening portion (102b) through which light passes, a blade group (104-109) configured to move on the opening forming member and form a light passing opening in the opening portion, and a power transmission member (103) arranged outside the opening portion and engaging with the blade group to transmit power.

(b) The blade group includes a pair of straight blades (104, 107) arranged on both sides of the opening portion to face each other on a straight line that connects the opening portion (102b) and a pivot center of the power transmission member (103) and configured to move forward and backward with respect to the opening portion, and a plurality of swing blades (105, 106, 108, 109) configured to swing in an oblique direction with respect to the opening portion on both sides of a moving direction of the pair of straight blades and enter the opening portion.

(c) In a process in which one end (103i) of the power transmission member (103) engaging with a first blade group (104, 105, 109) included in the blade group approaches the opening portion (102b), and the other end (103j) of the power transmission member engaging with a second blade group (106, 107, 108) included in the blade group separates from the opening portion (102b), a first opening edge portion forming a half of the light passing opening on a side of the power transmission member is formed by the first blade group (104, 105, 109) (the central edge portion is formed by the diaphragm blade 104, and an edge portion other than the central edge portion is formed by the diaphragm blades 105 and 109), and a second opening edge portion forming a remaining half of the light passing opening on a side opposite to the side of the power transmission member is formed by the second blade group (106, 107, 108), and the first blade group includes one straight blade (104) of the pair of straight blades and another first blade pair (105, 109), the second blade group includes the other straight blade (107) of the pair of straight blades and another second blade pair (106, 108), and at least one blade pair of the other first blade pair and the other second blade pair is formed by the swing blade.

That is, in the arrangement of the light amount adjusting device described here, to form the first opening edge portion forming the half of the light passing opening by the first blade group on the side of pushing to the opening portion by the power transmission member, the first blade group is operated collectively at one end of the power transmission member, and to form the second opening edge portion forming the remaining half by the second blade group on the side of pulling to the opening portion by the power transmission member, the second blade group is operated collectively at the other end of the power transmission member.

This can implement efficient traveling of the blades while saving space and can also form a satisfactory diaphragm opening shape.

Note that in the first and second embodiments, both the other first blade pair and the other second blade pair are formed by "swing blades", and "pivot blades" are not used.

Third Embodiment

Figure 12:
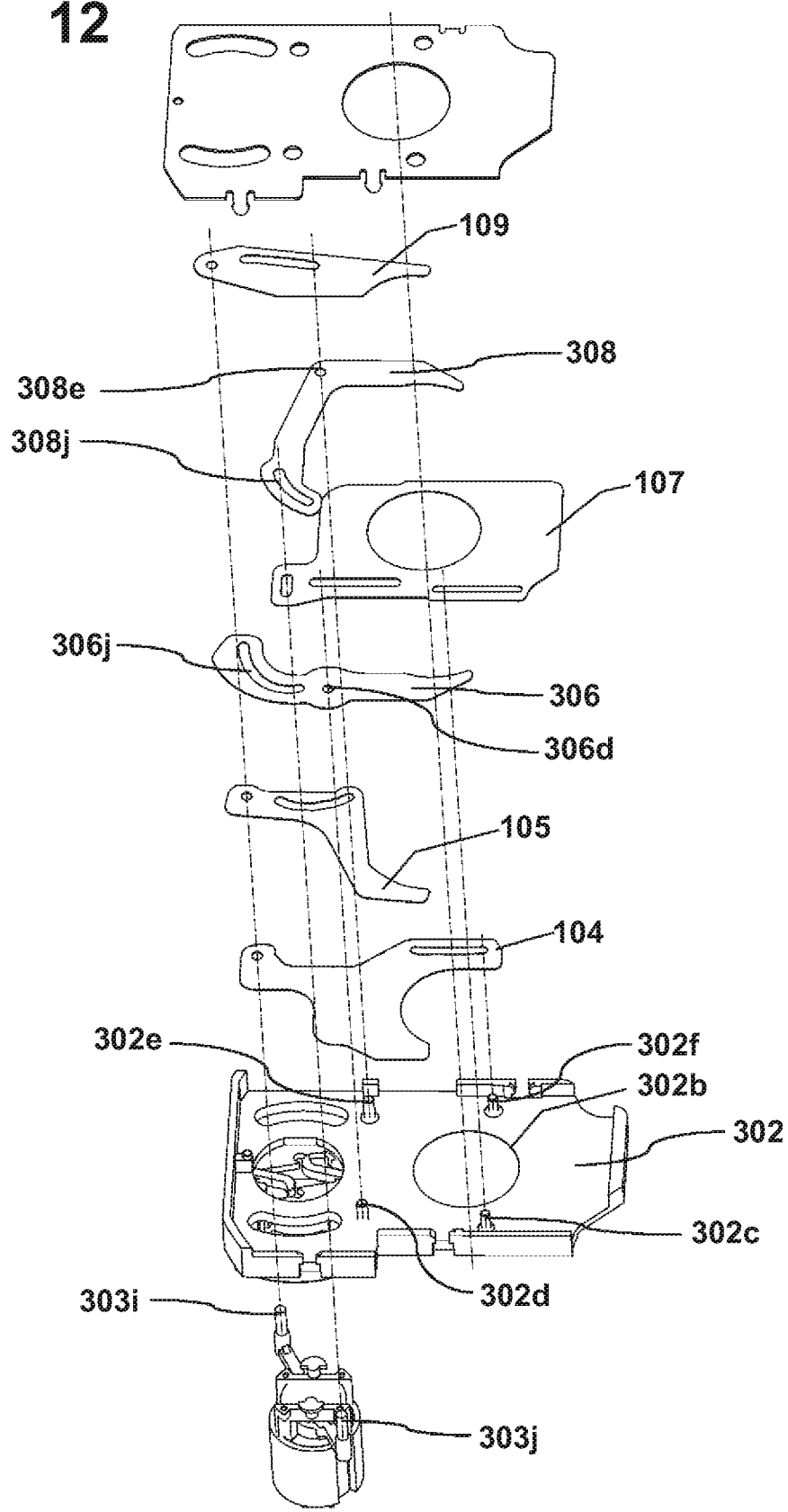
FIG. 12 is an exploded perspective view of a diaphragm device according to the third embodiment.
Figure 13:
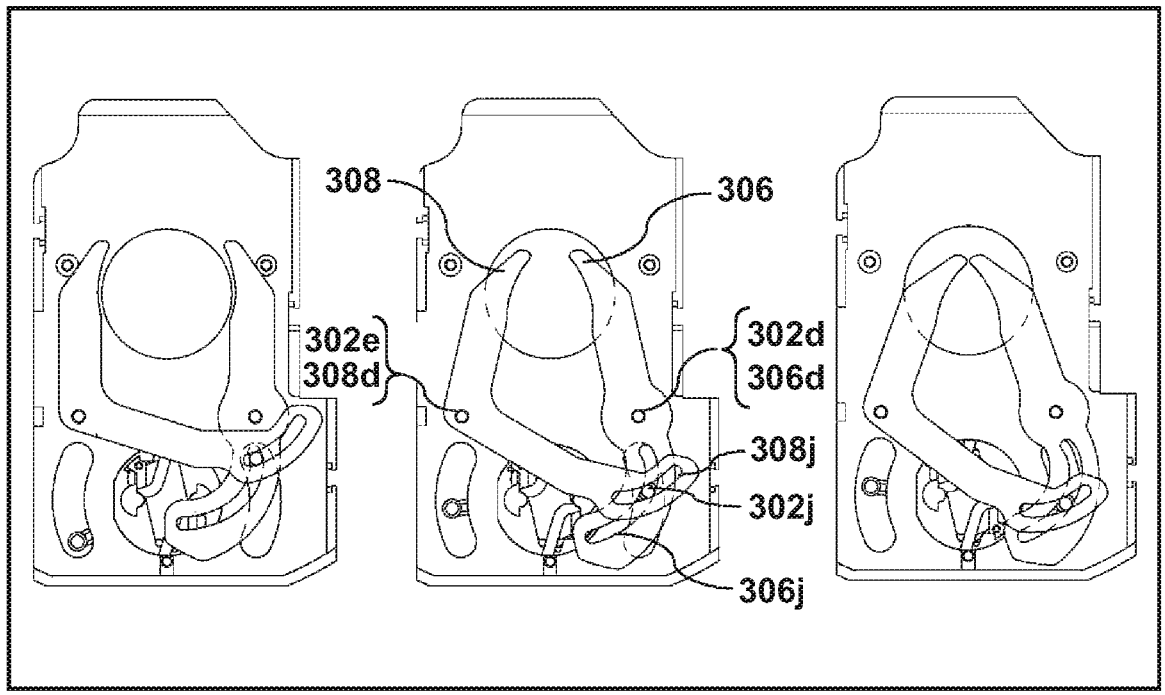
FIG. 13 is a front view of a third blade pair according to the third embodiment.

FIG. 12 is an exploded perspective view of a diaphragm device that is the third embodiment of a light amount adjusting device according to the present invention. FIG. 13 is a front view of a third blade pair according to the third embodiment. A diaphragm blade 306 and a diaphragm blade 308 form a third diaphragm blade pair.

The diaphragm blade 306 slidably engages with a blade drive pin 303*j* of a drive lever 303 in a drive cam groove portion 306*j*. In addition, a rotation center pin 302*d* serving as a rotation center portion (rotation center axis portion) formed on a base plate 302 rotatably engages with a rotation center hole portion 306*d* that is an engaging portion formed in the diaphragm blade 306.

When the drive lever 303 pivots within a predetermined angle range, the drive cam groove portion 306*j* receives the driving force from the blade drive pin 303*j*, and the diaphragm blade 306 rotates (turns) in an optical axis orthogonal plane about the rotation center pin 302*d* engaging with the rotation center hole portion 306*d*, as shown in FIG. 13. The speed of the rotation can be adjusted by the shape of the drive cam groove portion 306*j*. In addition, the shape of the diaphragm opening can also be corrected by the shape of the drive cam groove portion 306*j*.

The diaphragm blade 308 slidably engages with the blade drive pin 303*j* of the drive lever 303 in a drive cam groove portion 308*j*. In addition, a rotation center pin 302*e* serving as a rotation center portion (rotation center axis portion) formed on the base plate 302 rotatably engages with a rotation center hole portion 308*e* that is an engaging portion formed in the diaphragm blade 308.

When the drive lever 303 pivots within a predetermined angle range, the drive cam groove portion 308*j* receives the driving force from the blade drive pin 303*j*, and the diaphragm blade 308 rotates (turns) in an optical axis orthogonal plane about the rotation center pin 302*e* engaging with the rotation center hole portion 308*e*, as shown in FIG. 13. The speed of the rotation can be adjusted by the shape of the drive cam groove portion 308*j*. In addition, the shape of the diaphragm opening can also be corrected by the shape of the drive cam groove portion 308*j*.

A pair of straight blades has the same form as in the first and second embodiments or has a composite form. A first diaphragm blade pair is the same as in the first embodiment.

Figure 14:
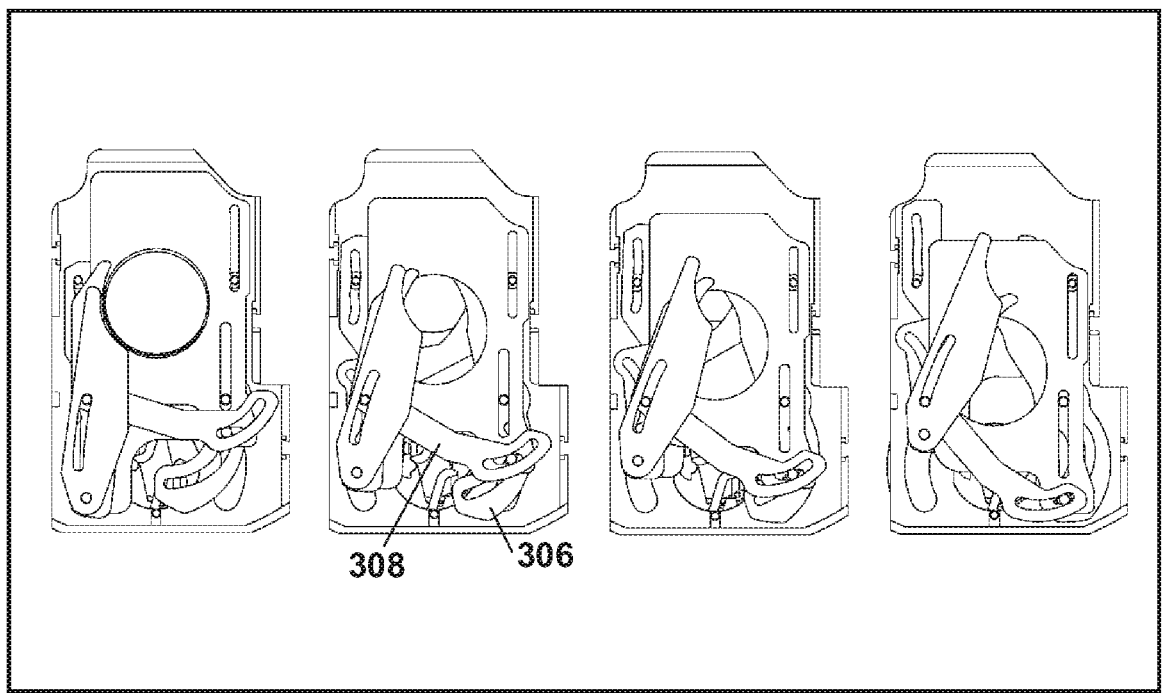
FIG. 14 is a front view showing a change of a diaphragm opening according to the third embodiment.

In the third embodiment, as shown in FIG. 14, a diaphragm opening close to a circle or with an almost regular hexagonal shape can be formed in each diaphragm state from a full-aperture state (left view) to a stopped-down-aperture state (right view).

Fourth Embodiment

Figure 15:
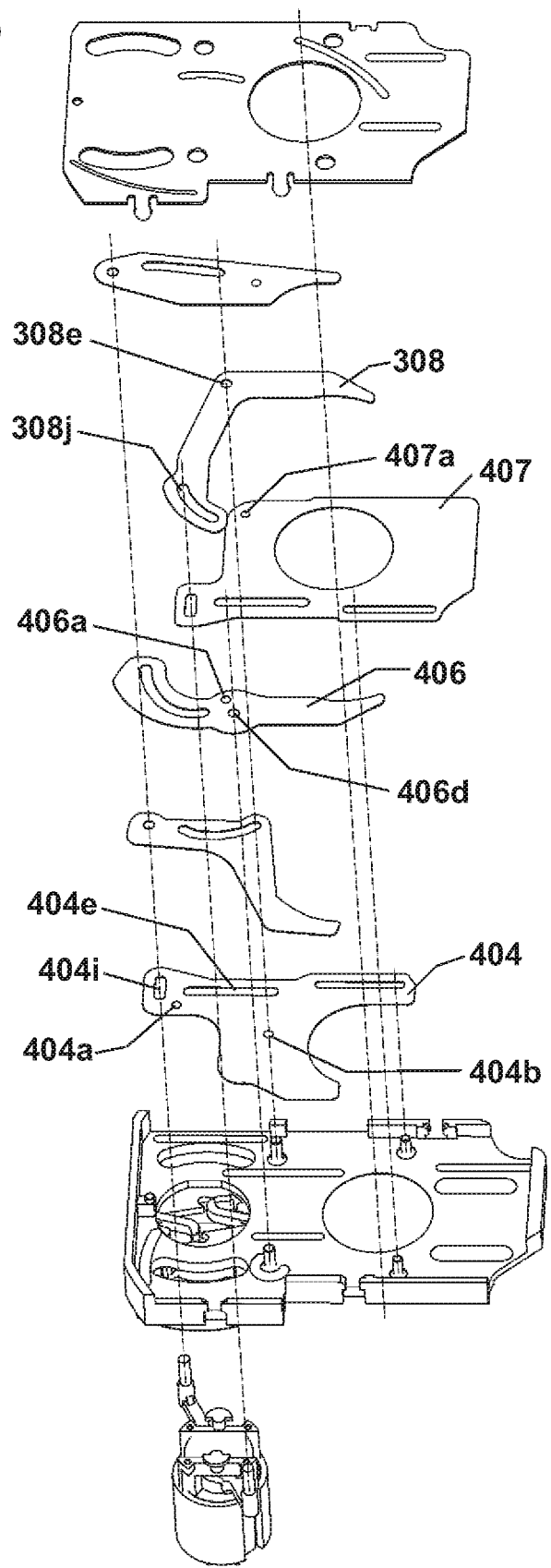
FIG. 15 is an exploded perspective view of a diaphragm device according to the fourth embodiment.

FIG. 15 is an exploded perspective view of a diaphragm device that is the fourth embodiment of a light amount adjusting device according to the present invention.

The fourth embodiment is an example in which the pair of straight blades of the second embodiment, the first diaphragm blade pair of the first embodiment, and the third diaphragm blade pair of the third embodiment are combined.

Figure 16:
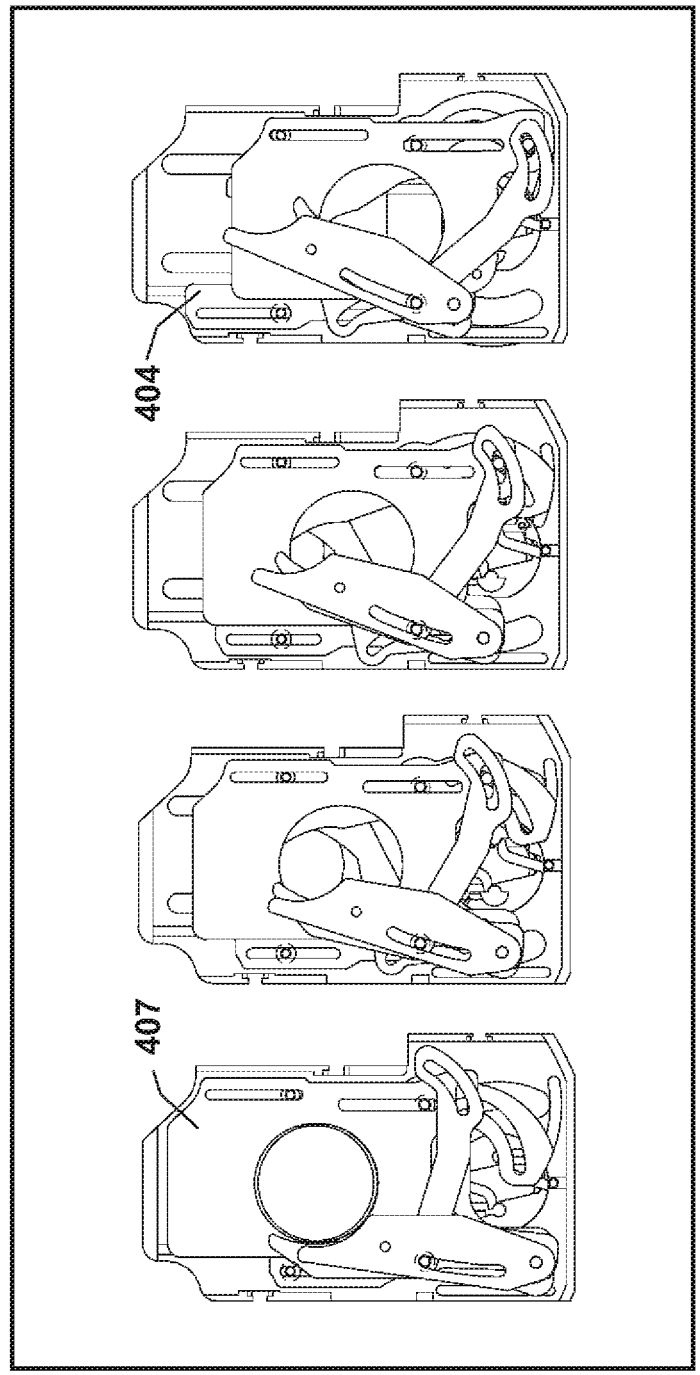
FIG. 16 is a front view showing a change of a diaphragm opening according to the fourth embodiment.

In the fourth embodiment, as shown in FIG. 16, a diaphragm opening close to a circle or with an almost regular hexagonal shape can be formed in each diaphragm state from a full-aperture state (left view) to a stopped-down-aperture state (right view).

Note that in the fourth embodiment, embossed portions 404*a* and 404*b* slightly projecting from the blade surface are formed beside a long hole 404*i* of a diaphragm blade 404 (one blade of the pair of straight blades) and almost at the center of the entire blade. In addition, an embossed portion 407*a* slightly projecting from the blade surface is formed at a corner portion of a diaphragm blade 407 (the other blade of the pair of straight blades). Furthermore, an embossed portion 406*a* slightly projecting from the blade surface is formed beside a rotation center hole portion 406*d* of a diaphragm blade 406. The embossed portions 404*a*, 404*b*, 407*a*, and 406*a* have a function of reducing the contact areas between the overlapping diaphragm blades and reducing the sliding resistance.

Fifth Embodiment

Figure 17:
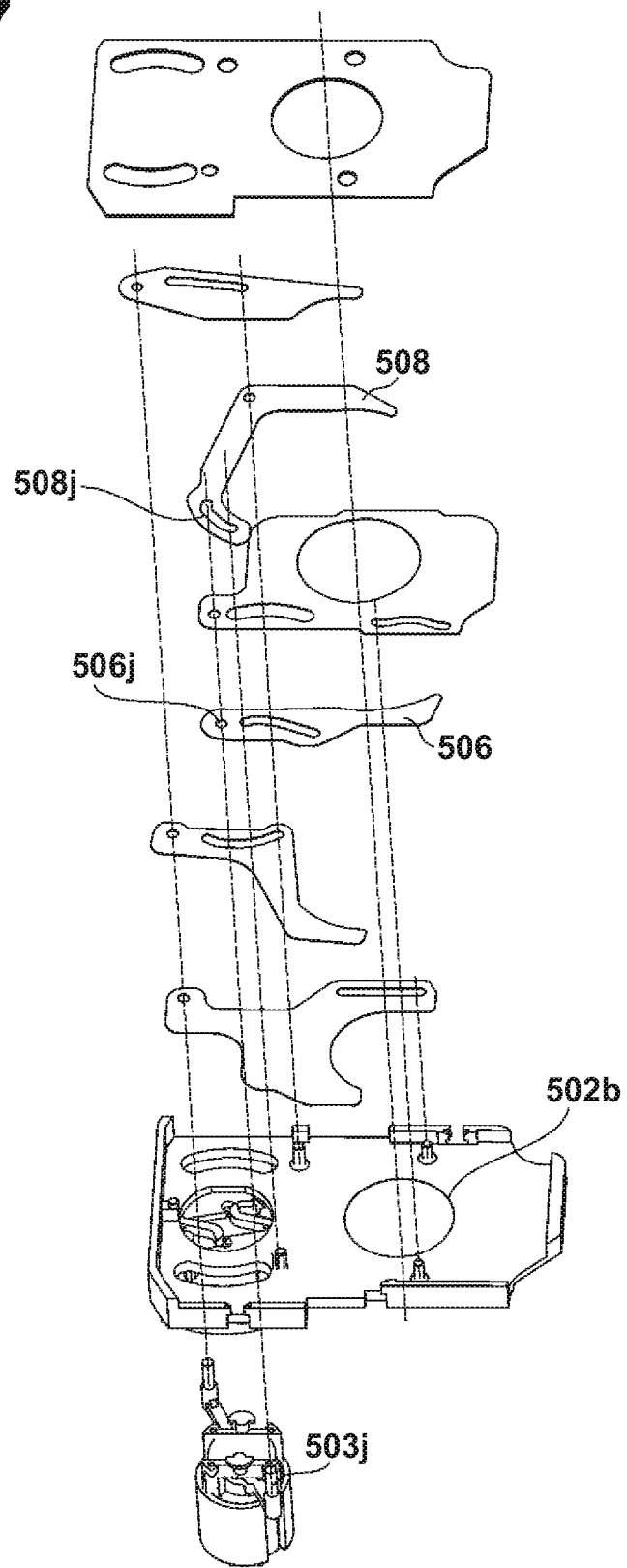
FIG. 17 is an exploded perspective view of a diaphragm device according to the fifth embodiment.
Figure 18:
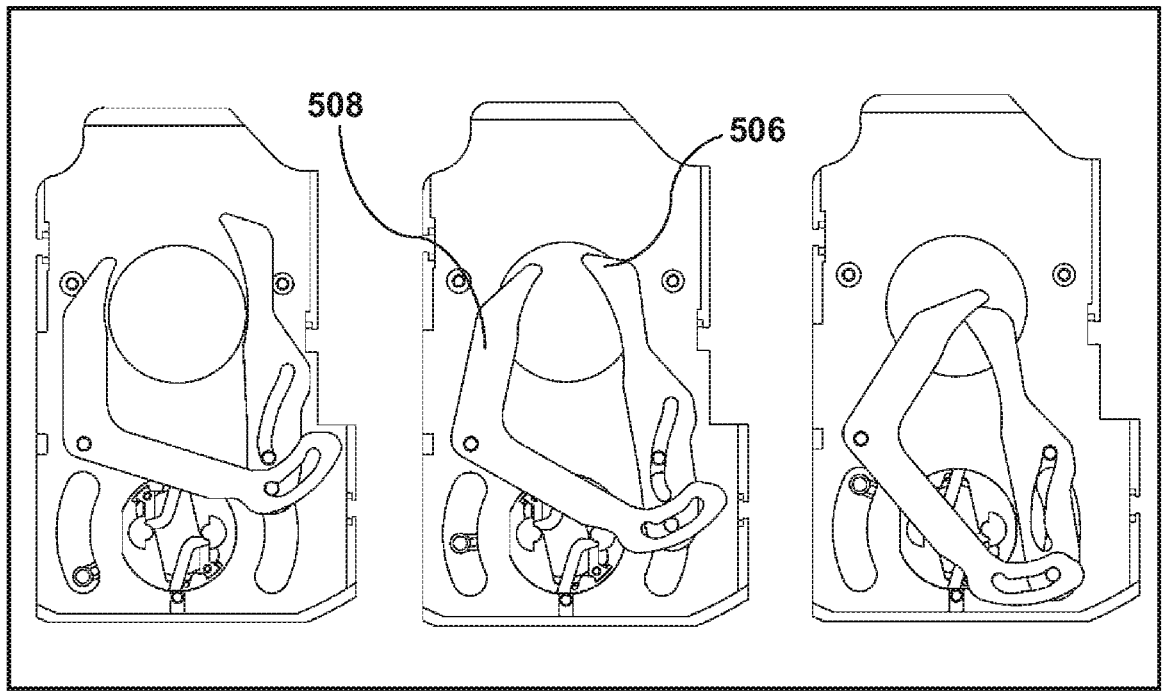
FIG. 18 is a front view of a fourth blade pair according to the fifth embodiment.

FIG. 17 is an exploded perspective view of a diaphragm device that is the fifth embodiment of a light amount adjusting device according to the present invention. FIG. 18 is a front view of a fourth blade pair according to the fifth embodiment. A diaphragm blade 506 and a diaphragm blade 508 form a fourth diaphragm blade pair.

The blades of the fourth diaphragm blade pair have drive hole portions 506*j* and 508*j* overlapping on the same blade drive pin 503*j* and are given the driving force.

The diaphragm blade 506 enters a fixed opening 502*b* obliquely with respect to the straight-ahead direction of a pair of straight blades. The diaphragm blade 508 enters the fixed opening 502*b* while rotating with respect to the straight-ahead direction of the pair of straight blades. The fourth diaphragm blade pair is a diaphragm blade pair formed by combining one blade of the second diaphragm blade pair and one blade of the third diaphragm blade pair.

Figure 19:
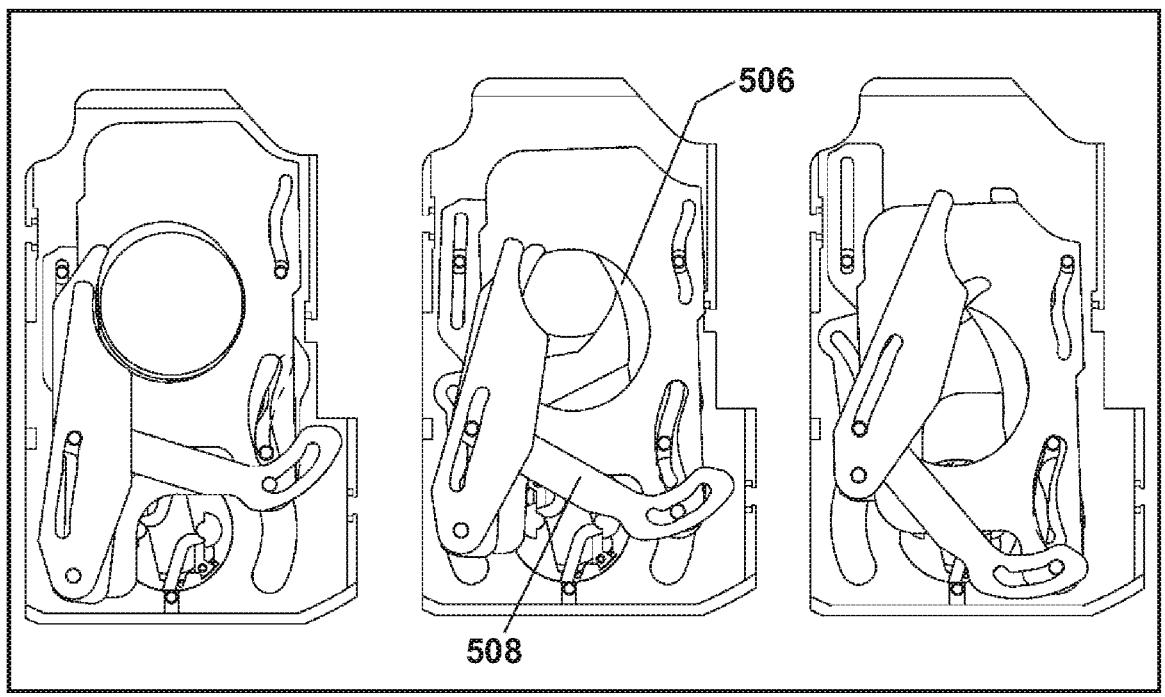
FIG. 19 is a front view showing a change of a diaphragm opening according to the fifth embodiment.

In the fifth embodiment, as shown in FIG. 19, a diaphragm opening close to a circle or with an almost regular hexagonal shape can be formed in each diaphragm state from a full-aperture state (left view) to a stopped-down-aperture state (right view).

Sixth Embodiment

Figure 20:
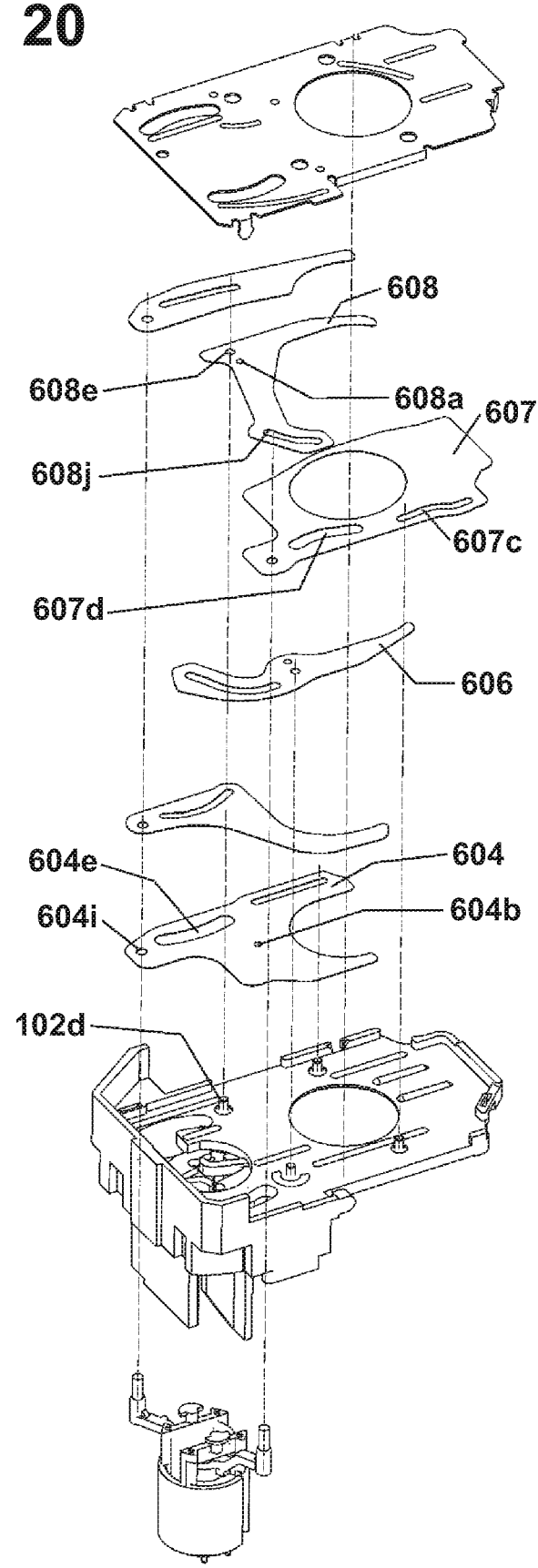
FIG. 20 is an exploded perspective view of a diaphragm device according to the sixth embodiment.
Figure 22A:
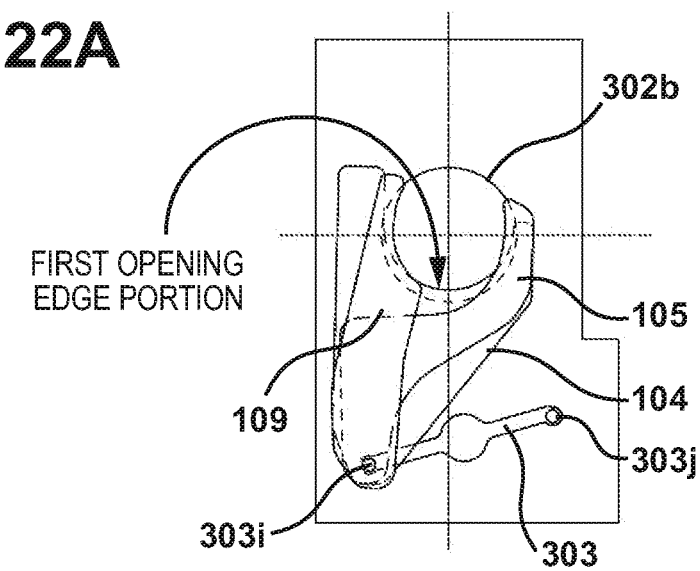
FIG. 22A is a view showing an overall arrangement according to the first to sixth embodiments.
Figure 22B:
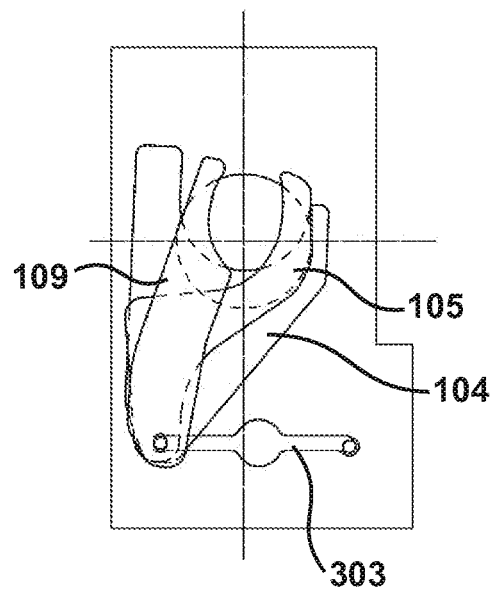
FIG. 22B is a view showing an overall arrangement according to the first to sixth embodiments.
Figure 22C:
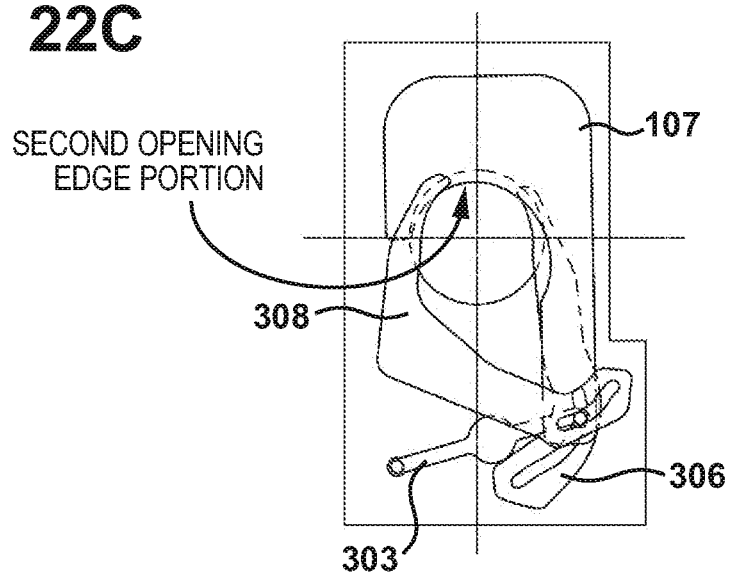
FIG. 22C is a view showing an overall arrangement according to the first to sixth embodiments.
Figure 22D:
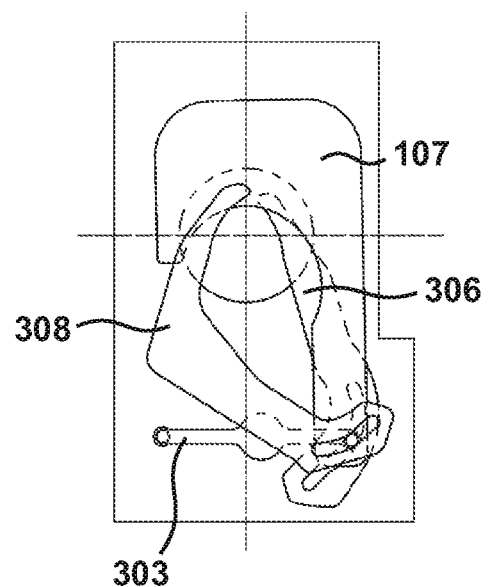
FIG. 22D is a view showing an overall arrangement according to the first to sixth embodiments.
Figure 22E:
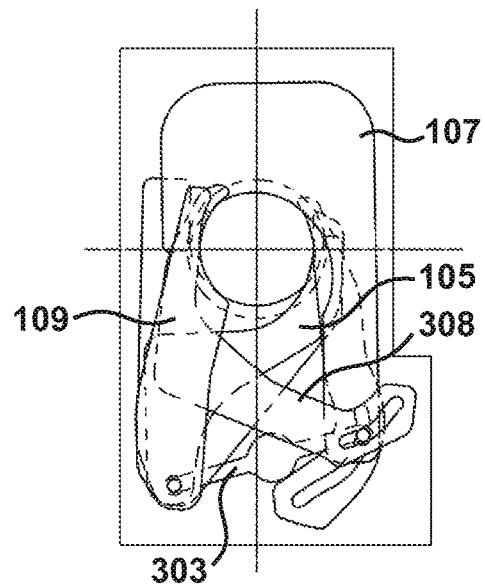
FIG. 22E is a view showing an overall arrangement according to the first to sixth embodiments.
Figure 22F:
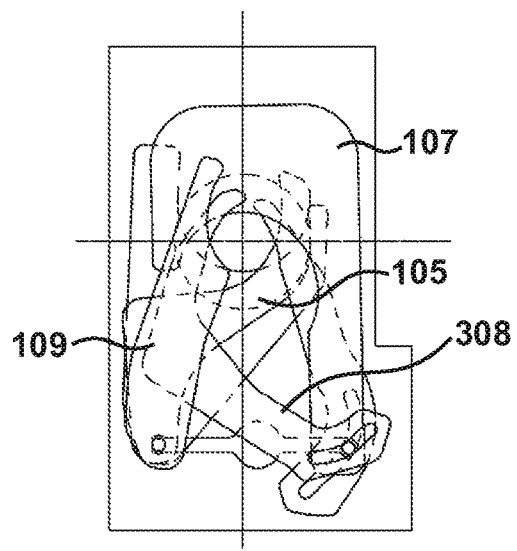
FIG. 22F is a view showing an overall arrangement according to the first to sixth embodiments.

FIG. 20 is an exploded perspective view of a diaphragm device that is the sixth embodiment of a light amount adjusting device according to the present invention.

The sixth embodiment basically has the same arrangement as in FIG. 15 showing the fourth embodiment, and the arrangement of the first embodiment or the fifth embodiment is partially combined.

Referring to FIG. 20, a rotation center hole portion 608*e* and a drive cam groove portion 608*j*, which are engaging portions, are formed in a diaphragm blade 608. In addition, an embossed portion 608*a* slightly projecting from the blade surface is formed beside the rotation center hole portion 608*e*. Note that a diaphragm blade 606 has the same arrangement as the diaphragm blade 406 shown in FIG. 15.

In addition, a diaphragm blade 607 (the other blade of a pair of straight blades) has almost the same arrangement as the diaphragm blade 407 shown in FIG. 15. However, like the diaphragm blade 107 according to the first embodiment, a guide long hole portion 607*c* having a cam shape that is not linear and a long hole portion 607*d* configured to avoid interference with a guide pin 102d are formed. With this arrangement, the diaphragm blade 607 slightly makes a swing motion, like the diaphragm blade 107 according to the first embodiment. An effect of making a base plate 102 small can thus be obtained, as in the first embodiment.

In addition, a diaphragm blade 604 (one blade of the pair of straight blades) has almost the same arrangement as the diaphragm blade 404 shown in FIG. 15. However, the long hole 404i of the diaphragm blade 404 changes to a round hole 604i, and the diaphragm blade 604 is configured to slightly swing, instead of making a pure linear motion, like the diaphragm blade 404. In correspondence with this, a long hole portion 604e corresponding to the guide long hole 404e of the diaphragm blade 404 is formed as a long hole configured to avoid interference with the guide pin 102d.

Furthermore, an embossed portion 604b like the embossed portion 404b of the diaphragm blade 404 shown in FIG. 15 is formed almost at the center of the diaphragm blade 604. This reduces the sliding resistance between the blades.

In the sixth embodiment, as shown in FIG. 21, a diaphragm opening close to a circle or with an almost regular hexagonal shape can be formed in each diaphragm state from a full-aperture state (left view) to a stopped-down-aperture state (right view).

Summary of Third to Sixth Embodiments

In the summary of the concept of the third to sixth embodiments, a "swing blade" means a diaphragm blade that makes a motion to swing as a whole when the blade drive pin 303i serving as the rotation center moves, like the diaphragm blade 105 and the diaphragm blade 109 shown in FIG. 12 as collectively described with reference to the first and second embodiment. In addition, a "pivot blade" means a diaphragm blade for which a rotation center pin 302d or 302e serving as the rotation center is erected and fixed and which makes a motion to pivot about the fixed center, like a diaphragm blade 306 and a diaphragm blade 308 shown in FIG. 12.

The concept of the third to sixth embodiments can be expressed as follows with reference to FIGS. 22A to 22F as well. Note that the concept will be described below by referring to the reference numerals in FIG. 12 showing the third embodiment.

(a) A light amount adjusting device includes an opening forming member (302) configured to form an opening portion (302b) through which light passes, a blade group (104, 105, 107, 109, 306, 308) configured to move on the opening forming member and form a light passing opening in the opening portion, and a power transmission member (303) arranged outside the opening portion and engaging with the blade group to transmit power.

(b) The blade group includes a pair of straight blades (104, 107) arranged on both sides of the opening portion to face each other on a straight line that connects the opening portion (302b) and a pivot center of the power transmission member (303) and configured to move forward and backward with respect to the opening portion, and a plurality of swing blades (105, 109, 306, 308) configured to swing in an oblique direction with respect to the opening portion on both sides of a moving direction of the pair of straight blades and enter the opening portion.

(c) In a process in which one end (303i) of the power transmission member (303) engaging with a first blade group (104, 105, 109) included in the blade group approaches the opening portion (302b), and the other end (303j) of the power transmission member engaging with a second blade group (306, 107, 308) included in the blade group separates from the opening portion (302b), a first opening edge portion forming a portion of a half of the light passing opening on a side of the power transmission member is formed by the first blade group (104, 105, 109), and a second opening edge portion forming a remaining half of the light passing opening on a side opposite to the side of the power transmission member is formed by the second blade group (107, 306, 308), and the first blade group includes one straight blade (104) of the pair of straight blades and another first blade pair (105, 109), the second blade group includes the other straight blade (107) of the pair of straight blades and another second blade pair (306, 308), and at least one blade pair (105, 109) of the other first blade pair and the other second blade pair is formed by the swing blade.

Note that in the third to sixth embodiments, the other first blade pair is formed by "swing blades", and the other second blade pair is formed by "pivot blades".

Seventh Embodiment

Figure 23:
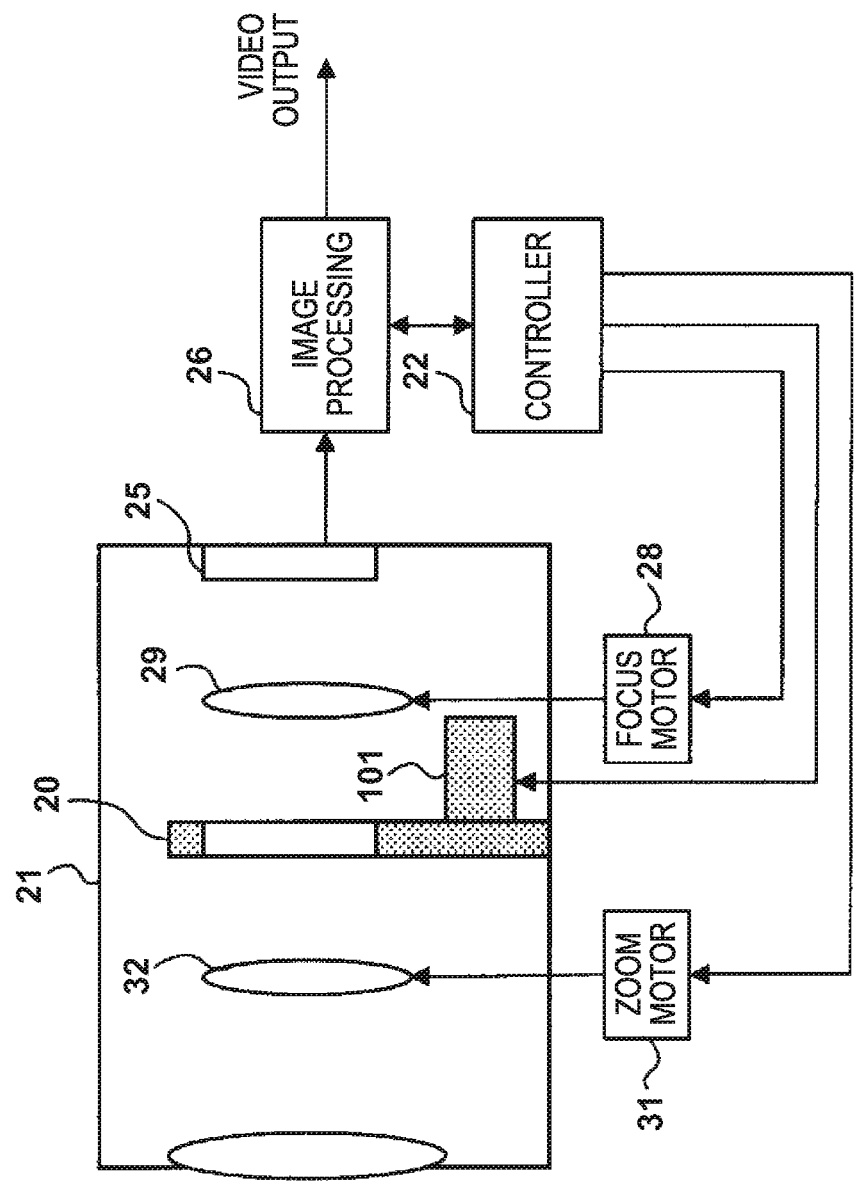
FIG. 23 is a schematic view of an optical device according to the seventh embodiment in which the diaphragm device according to one of the first to sixth embodiments is mounted.

FIG. 23 shows the schematic arrangement of a video camera (image capturing device) as an optical device in which one of the diaphragm devices described in the first to sixth embodiments is mounted.

A photographing optical system including a variable magnification lens 32, a diaphragm device 20 according to one of the first to fifth embodiments, which narrows the optical path, and a focus lens 29 is stored in a lens barrel portion 21 of the video camera.

An image capturing element 25 formed from a photoelectric conversion element such as a CCD sensor or a CMOS sensor photoelectrically converts an object image formed by the photographing optical system and outputs an electrical signal. The diaphragm opening of the diaphragm device 20 is changed, or an ND filter is moved forward and backward, thereby appropriately setting the brightness (that is, the amount of light that reaches the image capturing element 25) of the object image formed on the image capturing element 25.

The electrical signal output from the image capturing element 25 undergoes various kinds of image processing by an image processing circuit 26. A video signal (video output) is thus generated.

In accordance with an operation on a zoom switch (not shown) by the user, a controller 22 controls a zoom motor 31 to move the variable magnification lens 32 and perform magnification (zooming). In addition, the controller 22 detects the contrast of the video signal, and controls a focus motor 28 in accordance with the contrast to move the focus lens 29 and perform auto focus.

Furthermore, the controller 22 controls a diaphragm driving unit 101 (and an ND driving unit) of the diaphragm device 20 based on the luminance information of the video signal to adjust the light amount. Accordingly, a blur or ghost in image capturing can have a natural shape, and a high-quality video can be recorded. In addition, since the diaphragm device 20 incorporated in the lens barrel portion is compact, the lens barrel portion and the whole video camera can be made compact.

According to the above-described first to seventh embodiments, a diaphragm opening having a satisfactory shape can be formed by combining a pair of straight blades that move in a direction orthogonal to the light passing direction and another diaphragm blade pair that obliquely moves from a direction crossing the straight-ahead direction of the pair of straight blades.

In addition, when both diaphragm blades are driven by the same transmission portion provided on the drive lever having the rotation center at a position apart from the diaphragm opening in the direction orthogonal to the light passing direction, the device can be made compact as a whole, as compared to an arrangement that rotates a member such as a drive ring around a diaphragm opening.

Additionally, when all the drive hole portions of the diaphragm blades engaging with the pin of the drive lever serving as a power transmission member are formed as round holes, projection on the periphery of the drive lever can be suppressed, and the device can be made compact as a whole.

Furthermore, when the drive hole portions of the diaphragm blades engaging with the drive lever are formed as round holes to prevent deformation of the diaphragm blades, the durability of the device can be improved. Since this makes it possible to employ diaphragm blades thinner than in a conventional device, the device can be made thin. In addition, since the end-face reflection of the diaphragm blades that form the diaphragm opening can be suppressed by making the diaphragm blades thinner, the influence of light reflected by the end faces on the optical system can be reduced.

Additionally, in other words, according to the invention of each embodiment described above, there is provided a light amount adjusting device characterized by comprising:

an opening forming member configured to form an opening portion through which light passes;

a blade group configured to move on the opening forming member and form a light passing opening in the opening portion;

a power transmission member arranged outside the opening portion and engaging with the blade group to transmit power; and a blade group engaging with one end of the power transmission member to form the light passing opening in the opening portion, wherein the blade group includes a straight blade configured to operate linearly and a swing blade configured to swing from both sides in a straight-ahead operation of the straight blade toward a center of the light opening, and one of a half of the light passing opening on a side of the power transmission member and a half on a side opposite to the side of the power transmission member is formed by the blade group.

That is, when a half of the light passing opening on the side of the power transmission member or a half on a side opposite to the power transmission member is formed by the blade group engaging with one end of the power transmission member, a space to make the blade group pivot need not be provided near the one end of the power transmission member engaging with the blade group, resulting in space saving.

In particular, when the blade group engaging with both one end and the other end of the power transmission member is formed a straight blade and a swing blade, a space to make the blade group pivot need not be provided near the two ends of the power transmission member, resulting in further space saving.

Eighth Embodiment

Figure 24:
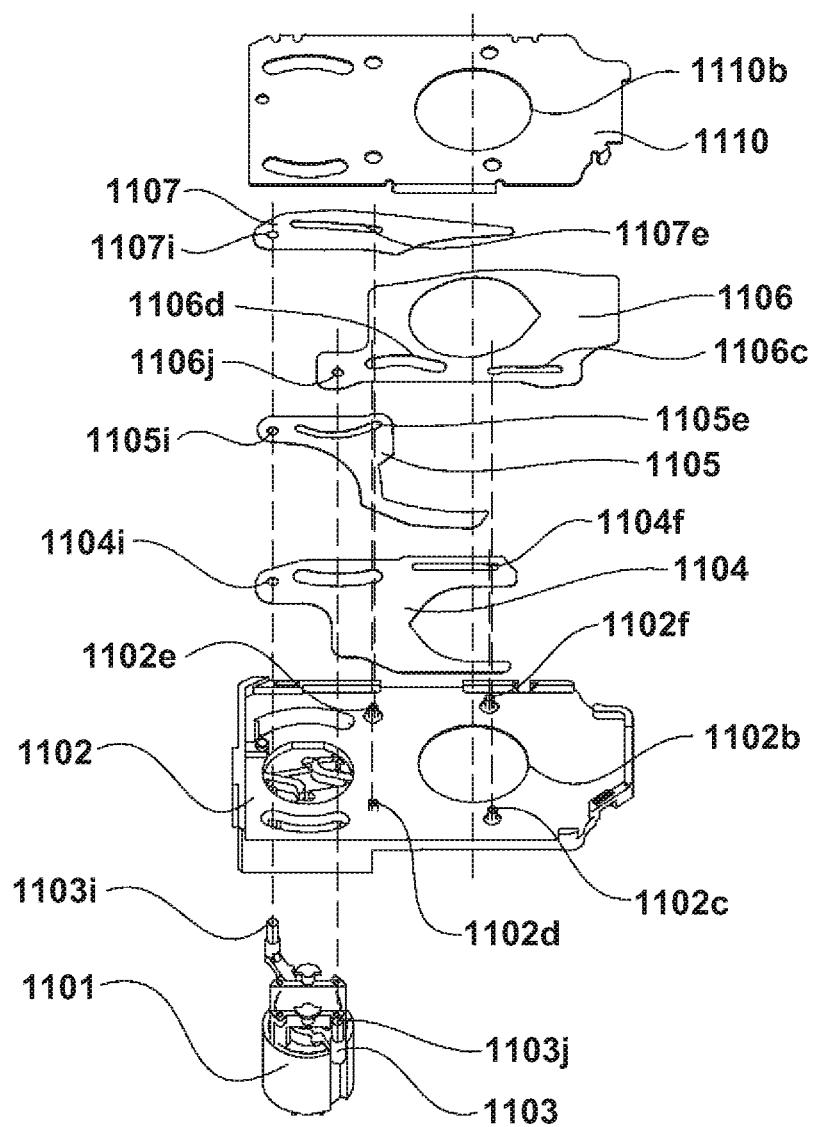
FIG. 24 is an exploded perspective view of a diaphragm device according to the eighth embodiment of the present invention.
Figure 25:
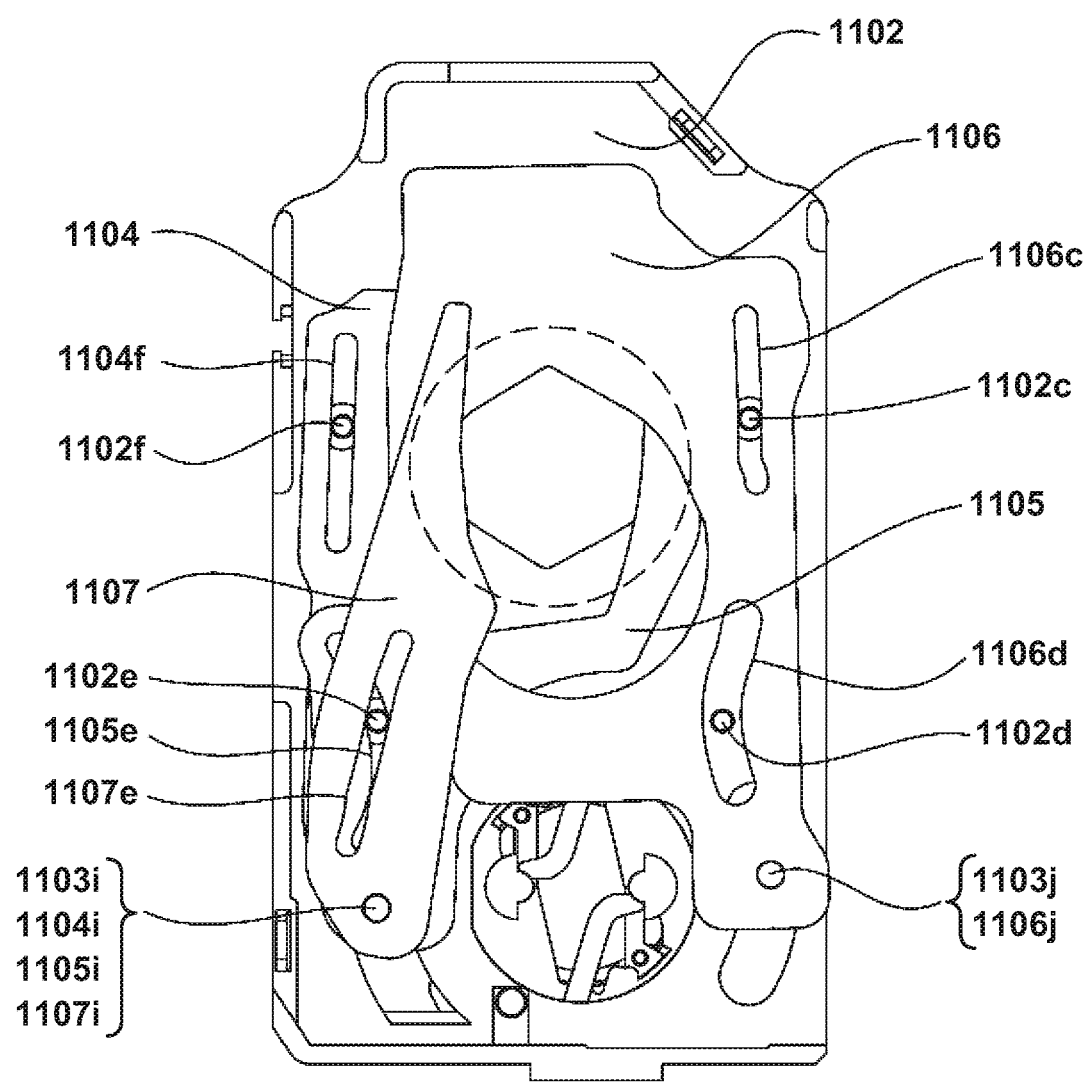
FIG. 25 is a front view of a diaphragm opening according to the eighth embodiment.
Figure 26:
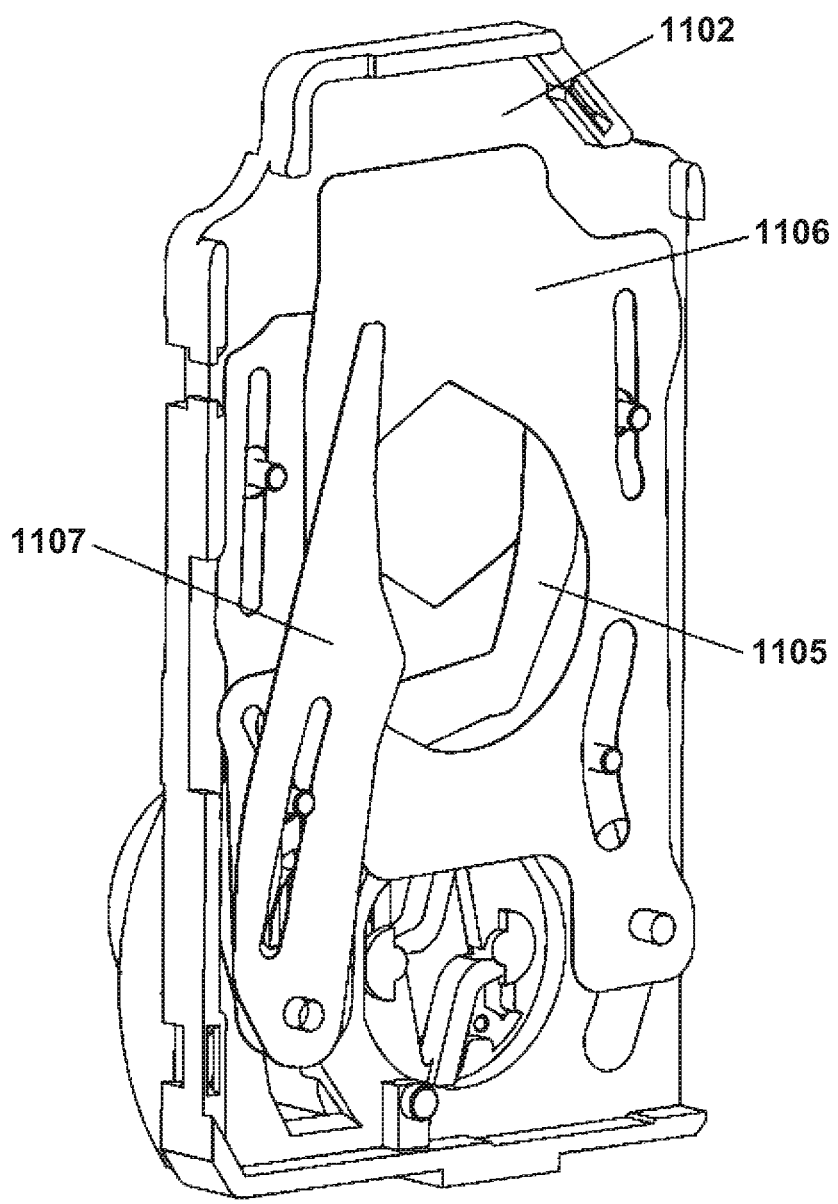
FIG. 26 is a perspective view of the diaphragm opening according to the eighth embodiment.

FIG. 24 is an exploded perspective view of a diaphragm device that is the eighth embodiment of a light amount adjusting device according to the present invention. FIG. 25 is a view showing the diaphragm device viewed from a direction (optical axis direction) in which light passes through a diaphragm opening formed by diaphragm blades (blade members) 1104 to 1107. Note that FIG. 25 shows a state in which a cover 1110 shown in FIG. 24 is removed. FIG. 26 is a view showing the diaphragm device in FIG. 25, which is viewed obliquely. Additionally, in these drawings, the vertical direction of the diaphragm device, which is the longitudinal direction, corresponds to the "direction orthogonal to the light passing direction", and this direction will be referred to as an optical axis orthogonal direction in the following explanation. In addition, the left-right direction of the diaphragm device in these drawings will be referred to as a width direction hereinafter.

Referring to FIGS. 24 to 26, a fixed opening 1102*b* that passes light is formed in a base plate 1102 serving as an opening forming member. The base plate 1102 is produced by press working, resin molding, or the like. On the outer surface (one surface in the optical axis direction) of the base plate 1102, a diaphragm driving unit 1101 is attached to a position (one-end side) apart from the fixed opening 1102*b* in the downward direction. The diaphragm driving unit 1101 is an electromagnetic drive motor (driving source) formed by, for example, a rotor magnet (not shown), a drive lever 1103 that rotates integrally with the rotor magnet, and a coil (not shown) that generates a magnetic force to rotate the rotor magnet when energized. The diaphragm driving unit 1101 may be a stepping motor.

Blade drive pins 1103*i* and 1103*j* of the drive lever 1103 extend through the base plate 1102 and project to the inner surface side of the base plate 1102. The drive lever 1103 pivots within a predetermined angle range about a shaft located apart from the fixed opening 1102*b* in the downward direction. The drive lever 1103 is produced by resin molding or the like.

The drive lever 1103 separately includes the blade drive pins 1103*i* and 1103*j* each serving as a transmission portion configured to drive the diaphragm blades 1104 to 1107 at the distal ends on both the left and right sides across the position of the pivot center. The blade drive pin 1103*i* engages with three diaphragm blades, that is, the diaphragm blade 1104 that is one blade of a pair of straight blades, and the diaphragm blade 1105 and the diaphragm blade 1107 which form a first diaphragm blade pair. The blade drive pin 1103*j* engages with the diaphragm blade 1106 that is the other blade of the pair of straight blades.

Note that the drive lever 1103 may be attached and arranged inside the base plate 1102 after the rotation center shaft of the diaphragm driving unit 1101 is extended through the base plate 1102.

As described above, in this embodiment, the two blade drive pins 1103*i* and 1103*j* are provided on one drive lever 1103 attached to the diaphragm driving unit 1101, and the diaphragm blades 1104, 1105, and 1107 are engaged with the same (common) blade drive pin 1103*i*. In addition, the diaphragm blade 1106 is engaged with the other blade drive pin 1103*j*. The drive lever 1103 on which the diaphragm blades engage with each of the plurality of (two) blade drive pins 1103*i* and 1103*j* is made to pivot, thereby moving the pair of straight blades (the diaphragm blade 1104 and the diaphragm blade 1106) in the optical axis orthogonal direction so as to sandwich the fixed opening 1102*b*. Simultaneously, the first diaphragm blade pair (the diaphragm blade 1105 and the diaphragm blade 1107) is obliquely moved with respect to the fixed opening 1102*b* (moved into the fixed opening 1102*b*) from a direction crossing the straight-ahead direction of the pair of straight blades. A polygonal diaphragm opening close to a circle is formed by the four diaphragm blades 1104 to 1107, and the size (diameter) of the diaphragm opening is changed.

When the above-described arrangement is employed, a diaphragm opening with a satisfactory shape can be formed while ensuring advantage in reducing the size of the diaphragm device, as compared to a case in which a drive ring (annular plate) arranged around a diaphragm opening is rotated, and straight diaphragm blades or rotational diaphragm blades are driven by the drive shaft portions of the drive ring, which are different from each other, as in PTL 2.

Note that "the diaphragm blades 1104 and 1106 as the pair of straight blades move in the optical axis orthogonal direction" includes a case in which the diaphragm blades 1104 and 1106 move in the optical axis orthogonal direction while swinging (rotating) or shifting in the width direction and a case in which the diaphragm blades 1104 and 1106 move straight (translate) in the optical axis orthogonal direction.

The cover 1110 is a cover attached to the base plate 1102 to form, with the base plate 1102, a space in which the diaphragm blades 1104 to 1107 move. The cover 1110 includes an opening 1110b corresponding to the fixed opening 1102b formed in the base plate 1102. The cover 1110 is produced by press working, resin molding, or the like. A rail (not shown) is formed on the inner surface (the surface on the base plate side) of the cover 1110 to reduce the sliding resistance to the diaphragm blades 1104 to 1107.

The diaphragm device according to this embodiment can change the diaphragm opening diameter by making the drive lever 1103 pivot, as described above, and can also completely close (fully close) the diaphragm opening. For this reason, the diaphragm device according to this embodiment can also perform a shutter operation. That is, the diaphragm device according to this embodiment can also be used as a shutter device.

Each diaphragm blade will be described below in more detail. The diaphragm blades 1104 to 1107 are produced by press working, resin molding, or the like.

Figure 27:
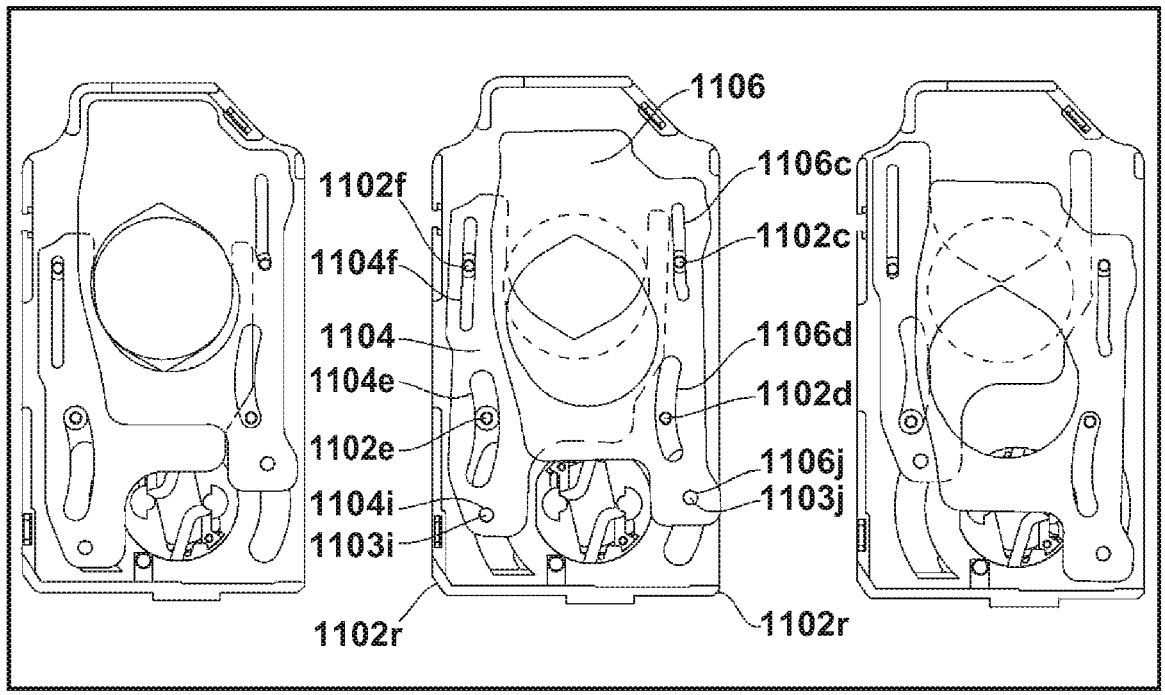
FIG. 27 is a front view of a pair of straight blades according to the eighth embodiment.

FIG. 27 is a view showing a pair of straight blades. The diaphragm blade 1104 and the diaphragm blade 1106 are blades that form the pair of straight blades, and move almost linearly (in an almost linear pattern) in a direction orthogonal to the light passing opening to sandwich the fixed opening 1102b. Each diaphragm blade will be described below in detail.

The diaphragm blade 1104 (one blade of the pair of straight blades) rotatably engages with the blade drive pin 1103i of the drive lever 1103 in a circular drive hole portion 1104i that is the first engaging portion. In addition, a guide pin 1102f serving as a guide portion (guide shaft portion) formed on the base plate 1102 slidably engages with a guide long hole portion 1104f serving as the second engaging portion formed in the diaphragm blade 1104 (one blade of the pair of straight blades) to extend in the optical axis orthogonal direction.

When the drive lever 1103 pivots within the above-described predetermined angle range, the diaphragm blade 1104 (one blade of the pair of straight blades) receives the driving force from the blade drive pin 1103i in the drive hole portion 1104i, rotatably moves about the blade drive pin 1103i engaging with the drive hole portion 1104i, and is driven in the optical axis orthogonal direction while the guide long hole portion 1104f is guided by the guide pin 1102f.

At this time, since the blade drive pin 1103i moves to draw a circular arc about the diaphragm driving unit 1101, the diaphragm blade 1104 (one blade of the pair of straight blades) swings about the guide pin 1102f in the width direction while being guided by the guide pin 1102f in the optical axis orthogonal direction. That is, when the diaphragm blade 1104 (one blade of the pair of straight blades) reaches the lower end of the base plate 1102 and retracts from the fixed opening 1102b, the drive hole portion 1104i of the diaphragm blade 1104 (one blade of the pair of straight blades) swings so as to be pulled in a direction to move close to a line that connects the center of the fixed opening 1102b and the rotation center axis of the drive lever 1103. For this reason, in this embodiment, a corner portion 1102r on the left side of the base plate 1102 shown in FIG. 27 can be formed into a circular arc shape recessed inward as compared to a case in which the diaphragm blade 1104 (one blade of the pair of straight blades) simply moves straight without swinging, and the base plate 1102 can thus be made small.

In addition, to simply move the diaphragm blade 1104 (one blade of the pair of straight blades) straight without swinging, it is necessary to form the drive hole portion 1104i into a long hole long in the width direction of the diaphragm device, provide two guide pins 1102f on the base plate 1102 to enable a straight movement, and provide two guide long hole portions 1104f formed on the diaphragm blade 1104 (one blade of the pair of straight blades). However, since the diaphragm blade 1104 is driven in the optical axis orthogonal direction while swinging in this embodiment, the number of guide pins 1102f provided on the base plate 1102 can be one. In addition, the number of guide long hole portions 1104f formed on the diaphragm blade 1104 (one blade of the pair of straight blades) can also be one. As a result, the diaphragm blade 1104 (one blade of the pair of straight blades) can be made smaller and, accordingly, the base plate 1102 can be made smaller. Hence, the diaphragm device can be made compact, and an optical device such as a camera or an interchangeable lens in which the diaphragm device is mounted can also be made compact.

The speed of the swing of the diaphragm blade 1104 (one blade of the pair of straight blades) about the guide pin 1102f can be adjusted by forming the guide long hole portion 1104f into a cam groove shape. Additionally, in this embodiment, the shape of the diaphragm opening to obtain a satisfactory diaphragm opening shape can also be corrected by adjusting the cam groove shape of the guide long hole portion 1104f, as compared to a case in which the diaphragm blade 1104 (one blade of the pair of straight blades) simply moves straight without swinging.

The diaphragm blade 1106 (the other blade of the pair of straight blades) rotatably engages with the blade drive pin 1103j of the drive lever 1103 in a circular drive hole portion 1106j that is the third engaging portion. In addition, a guide pin 1102c serving as a guide portion (guide portion) formed on the base plate 1102 slidably engages with (is inserted into) a guide long hole portion 1106c serving as the fourth engaging portion formed in the diaphragm blade 1106 (the other blade of the pair of straight blades) to extend in the optical axis orthogonal direction.

When the drive lever 1103 pivots within the above-described predetermined angle range, the diaphragm blade 1106 (the other blade of the pair of straight blades) receives the driving force from the blade drive pin 1103j in the drive hole portion 1106j, rotatably moves about the blade drive pin 1103j engaging with the drive hole portion 1106j, and is driven in the optical axis orthogonal direction while the guide long hole portion 1106c is guided by the guide pin 1102c.

At this time, since the blade drive pin 1103j moves to draw a circular arc about the diaphragm driving unit 1101, the diaphragm blade 1106 (the other blade of the pair of straight blades) swings about the guide pin 1102c in the width direction while being guided by the guide pin 1102c in the optical axis orthogonal direction. That is, when the diaphragm blade 1106 (the other blade of the pair of straight blades) reaches the lower end of the base plate 1102 and retracts from the fixed opening 1102b, the drive hole portion 1106j of the diaphragm blade 1106 (the other blade of the pair of straight blades) swings so as to be pulled in a direction to move close to a line that connects the center of the fixed opening 1102b and the rotation center axis of the drive lever 1103. For this reason, in this embodiment, the corner portion 1102r on the right side of the base plate 1102 shown in FIG. 27 can be formed into a circular arc shape recessed inward as compared to a case in which the diaphragm blade 1106 (the other blade of the pair of straight blades) simply moves straight without swinging, and the base plate 1102 can thus be made small.

In addition, to simply move the diaphragm blade 1106 (the other blade of the pair of straight blades) straight without swinging, it is necessary to form the drive hole portion 1106j into a long hole long in the width direction of the diaphragm device, provide two guide pins 1102c on the base plate 1102 to enable a straight movement, and provide two guide long hole portions 1106c formed on the diaphragm blade 1106 (the other blade of the pair of straight blades). However, since the diaphragm blade 1106 is driven in the optical axis orthogonal direction while swinging in this embodiment, the number of guide pins 1102c provided on the base plate 1102 can be one. In addition, the number of guide long hole portions 1106c formed on the diaphragm blade 1106 (the other blade of the pair of straight blades) can also be one. As a result, the diaphragm blade 1106 (the other blade of the pair of straight blades) can be made smaller and, accordingly, the base plate 1102 can be made smaller. Hence, the diaphragm device can be made compact, and an optical device such as a camera or an interchangeable lens in which the diaphragm device is mounted can also be made compact.

The speed of the swing of the diaphragm blade 1106 (the other blade of the pair of straight blades) about the guide pin 1102c can be adjusted by forming the guide long hole portion 1106c into a cam groove shape. Additionally, in this embodiment, the shape of the diaphragm opening to obtain a satisfactory diaphragm opening shape can also be corrected by adjusting the cam groove shape of the guide long hole portion 1106c, as compared to a case in which the diaphragm blade 1106 (the other blade of the pair of straight blades) simply moves straight without swinging.

In addition, a long hole portion 1106d configured to avoid interference with a guide pin 1102d is formed in the diaphragm blade 1106. When the guide pin 1102d extends through the long hole portion 1106d, the shape of the diaphragm blade 1106 can be formed into a shape capable of ensuring the strength and the guide pin 1102d can efficiently be arranged on the base plate 1102. Furthermore, when the long hole portion 1106d is formed in the diaphragm blade 1106, the diaphragm blade 1106 can be made lightweight, and this is effective for the shutter operation.

Figure 28:
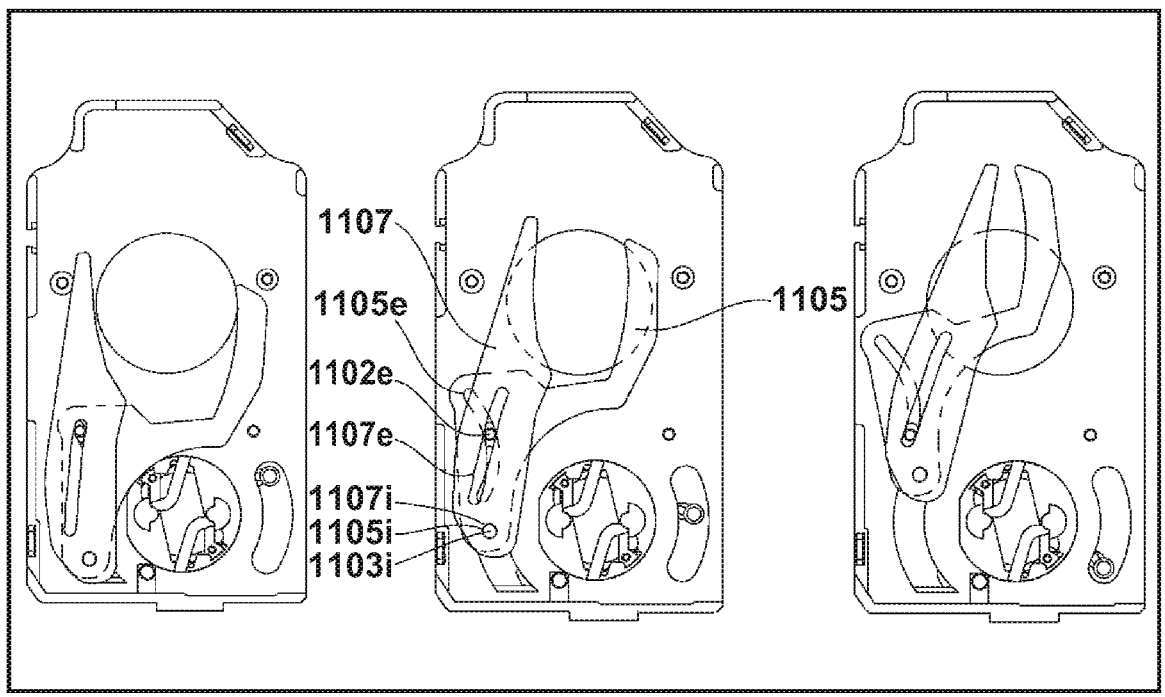
FIG. 28 is a front view of a first blade pair according to the eighth embodiment.

FIG. 28 is a view showing the first diaphragm blade pair. The diaphragm blade 1105 and the diaphragm blade 1107 form the first diaphragm blade pair, and their one-end sides overlap each other in the optical axis direction on the blade drive pin 1103i of the drive lever 1103. The diaphragm blades move in an oblique direction with respect to the fixed opening 1102b from a direction crossing the straight-ahead moving direction of the pair of straight blades. Each diaphragm blade will be described below in detail.

The diaphragm blade 1105 (one blade of the first diaphragm blade pair) rotatably engages with the blade drive pin 1103i of the drive lever 1103 in a circular drive hole portion 1105i that is the first engaging portion. In addition, a guide pin 1102e serving as a guide portion (guide shaft portion) formed on the base plate 1102 slidably engages with a guide long hole portion 1105e serving as the fifth engaging portion formed in the diaphragm blade 1105 (one blade of the first diaphragm blade pair) to extend in the optical axis orthogonal direction.

When the drive lever 1103 pivots within the above-described predetermined angle range, the diaphragm blade 1105 (one blade of the first diaphragm blade pair) receives the driving force from the blade drive pin 1103i in the drive hole portion 1105i, and rotatably moves about the blade drive pin 1103i engaging with the drive hole portion 1105i. Then, the diaphragm blade 1105 moves obliquely with respect to the fixed opening 1102b from a direction (width direction) crossing the straight-ahead direction of the pair of straight blades while the guide long hole portion 1105e is guided by the guide pin 1102e.

The speed of the swing of the diaphragm blade 1105 (one blade of the first diaphragm blade pair) about the guide pin 1102e can be adjusted by forming the guide long hole portion 1105e into a cam groove shape. Additionally, in this embodiment, the shape of the diaphragm opening to obtain a satisfactory diaphragm opening shape can also be corrected by adjusting the cam groove shape of the guide long hole portion 1105e, as compared to a case in which the diaphragm blade 1105 (one blade of the first diaphragm blade pair) simply moves straight without swinging.

The diaphragm blade 1107 (the other blade of the first diaphragm blade pair) rotatably engages with the blade drive pin 1103i of the drive lever 1103 in a circular drive hole portion 1107i that is the first engaging portion. In addition, the guide pin 1102e serving as a guide portion (guide shaft portion) formed on the base plate 1102 slidably engages with a guide long hole portion 1107e serving as the fifth engaging portion formed in the diaphragm blade 1107 (the other blade of the first diaphragm blade pair) to extend in the optical axis orthogonal direction.

When the drive lever 1103 pivots within the above-described predetermined angle range, the diaphragm blade 1107 (the other blade of the first diaphragm blade pair) receives the driving force from the blade drive pin 1103i in the drive hole portion 1107i, and rotatably moves about the blade drive pin 1103i engaging with the drive hole portion 1107i. Then, the diaphragm blade 1107 moves obliquely with respect to the fixed opening 1102b from a direction crossing the straight-ahead direction of the pair of straight blades while the guide long hole portion 1107e is guided by the guide pin 1102e.

The speed of the swing of the diaphragm blade 1107 (the other blade of the first diaphragm blade pair) about the guide pin 1102e can be adjusted by forming the guide long hole portion 1107e into a cam groove shape. Additionally, in this embodiment, the shape of the diaphragm opening to obtain a satisfactory diaphragm opening shape can also be corrected by adjusting the cam groove shape of the guide long hole portion 1107e, as compared to a case in which the diaphragm blade 1107 (the other blade of the first diaphragm blade pair) simply moves straight without swinging.

The blades of the first diaphragm blade pair engage with the same blade drive pin 1103*i* with the drive hole portions 1105*i* and 1107*i* overlapping each other, and are given the driving force. In addition, they are guided by the same guide pin 1102*e*. When the shapes of the guide long hole portion 1105*e* and the guide long hole portion 1107*e* are changed, the blades of the first diaphragm blade pair enter the fixed opening 1102*b* obliquely from different directions to sandwich the fixed opening 1102*b* with respect to the straight-ahead direction of the pair of straight blades.

Figure 29:
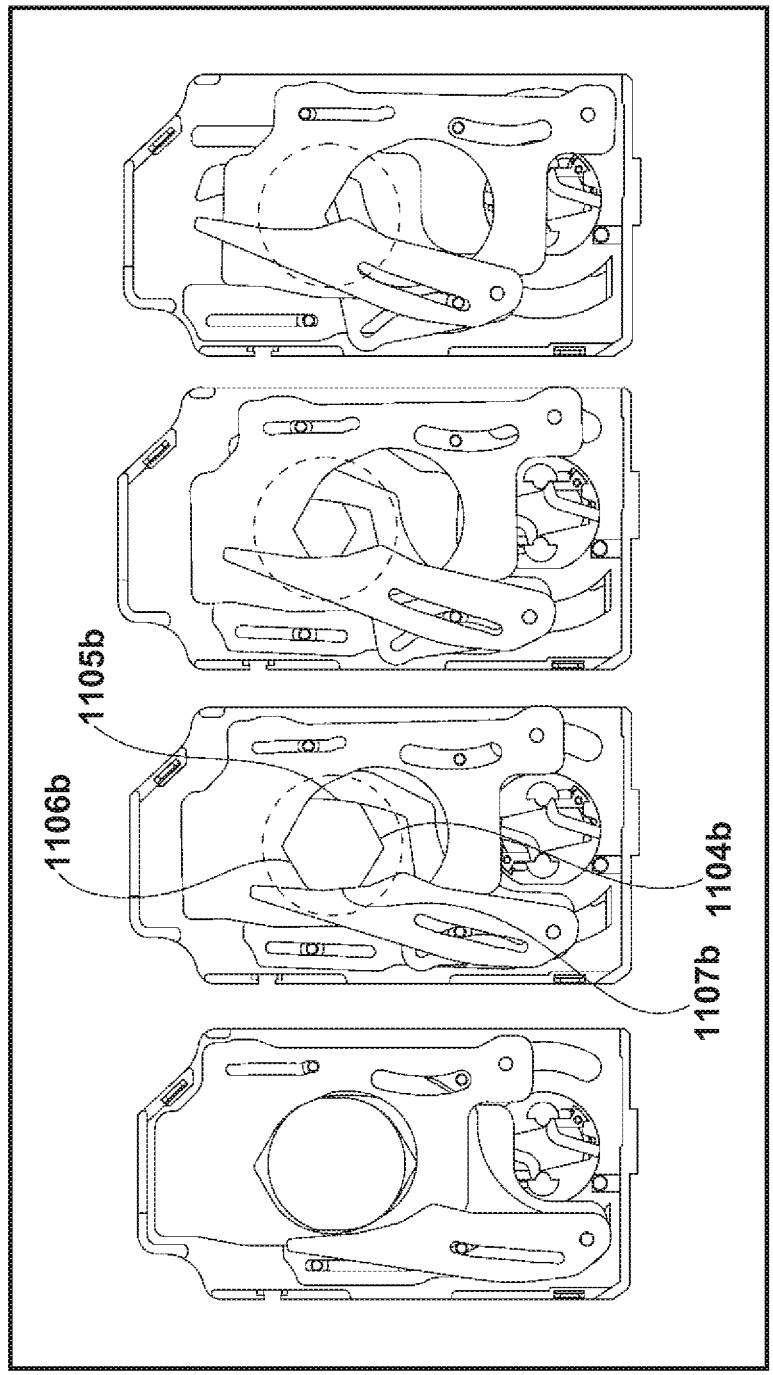
FIG. 29 is a front view showing a change of the diaphragm opening according to the eighth embodiment.

The movements of the diaphragm blades 1104 to 1107 with respect to the pivot position of the drive lever 1103 can be adjusted by the shapes of the guide long hole portions 1104*f*, 1105*e*, 1106*c*, and 1107*e* formed in the blades. Accordingly, as shown in FIG. 29, a diaphragm opening close to a circle or with an almost regular hexagonal shape can be formed by opening forming edge portions 1104*b*, 1105*b*, 1106*b*, and 1107*b* of the diaphragm blades 1104 to 1107 in each diaphragm state from a full-aperture state (left view) to a stopped-down-aperture state (right view).

The reason why the eighth embodiment is effective for size reduction and excellent in durability and enables thinning will be described here.

In the eighth embodiment, all the drive hole portions of the diaphragm blades engaging with the drive lever 1103 are round holes. The width can be suppressed as compared to a case in which the drive hole portions are long holes. For this reason, in the eighth embodiment, the width does not change in the whole area in the longitudinal direction. The diaphragm blades can be laid out without projecting on the periphery of the drive lever 1103. Since the unevenness of the parts can be reduced, the parts can be simplified, resulting in low cost and high quality. In addition, when the diaphragm device is made compact, it can easily be combined with a lens barrel or a camera, resulting in an improved assembling property.

In addition, when the drive hole portions of the diaphragm blades engaging with the drive lever 1103 are formed into round holes, the durability improves. The eighth embodiment can be used not only as an action of slowly opening/closing the diaphragm blades and adjusting the light amount but also as a shutter function. In the shutter operation, the drive lever 1103 rotates at a high speed in a direction in which the blades are closed. For this reason, the drive hole portions of the diaphragm blades receive a large force necessary to achieve a high shutter speed from the blade drive pins 1103*i* and 1103*j* of the drive lever 1103. In addition, because of the high-speed shutter action, the drive lever 1103 collides against a stopper (not shown) of the base plate 1102 and rebounds. The drive hole portions of the diaphragm blades receive the large force at the time of rebound of the drive lever 1103 as well. Since the drive lever 1103 abruptly rebounds in a direction in which the blades open in a state in which the diaphragm blades are moving in the direction in which they are closed, a large load is applied to the drive hole portions of the diaphragm blades. When the drive hole portions are long holes, they are pulled and deformed by the drive lever 1103. For this reason, when the drive hole portions are long holes, the durability count is limited. If the drive hole portions are round holes, the drive hole portions receive the force from the drive lever 1103, but the holes are not distorted and, therefore, the diaphragm blades are hardly deformed. Hence, the durability of the diaphragm blades is largely improved. All the drive hole portions are preferably formed into round holes, as in this embodiment. In addition, at least one drive hole portion formed as a round hole engaging with the blade drive pin preferably exists. Since the diaphragm blades overlap at the engaging portions with the blade drive pins, the diaphragm blades of the drive hole portions formed as round holes can suppress the deformation of the long hole engaging portions of the other diaphragm blades.

As described above, in the eighth embodiment, the durability of the diaphragm blades is largely improved. For this reason, in the eighth embodiment, the thickness of the diaphragm blade can be decreased. As the problem of the conventional iris diaphragm, the device becomes thick because a number of diaphragm blades are overlaid to form a circular diaphragm opening, and there is a need to ensure durability. In the eighth embodiment, all the drive hole portions of the diaphragm blades, which directly receive the force from the drive lever 1103, are round holes and are hardly deformed. For this reason, the thickness of the diaphragm blades can be decreased, and this is effective for thinning of the device.

As described above, the diaphragm device according to this embodiment moves each diaphragm blade by driving one drive lever 1103 without using a part such as a drive ring that rotates around the diaphragm opening. It is therefore possible to make the diaphragm device compact in the longitudinal direction and the width direction and also decrease the thickness in the optical axis direction.

Note that in this embodiment, a case in which hole portions or groove portions are formed in the diaphragm blades 1104 to 1107, and the pins formed on the drive lever 1103 or the base plate 1102 are engaged with (inserted into) these hole portions or groove portions has been described. However, an arrangement in which the pins are provided on the diaphragm blades and inserted into hole portions or groove portions formed in the drive lever or the base plate can also be employed.

Ninth Embodiment

Figure 30:
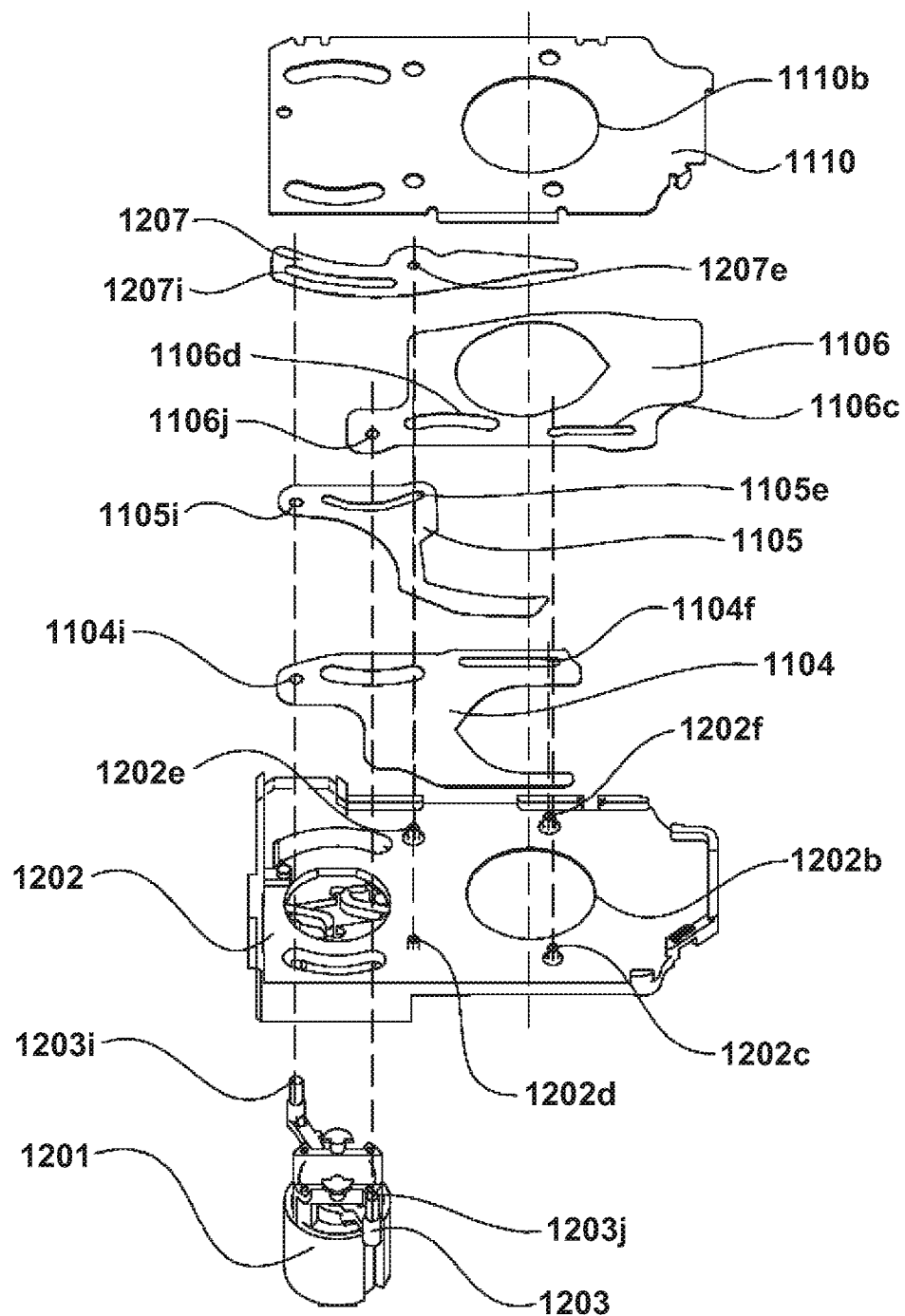
FIG. 30 is an exploded perspective view of a diaphragm device according to the ninth embodiment.
Figure 31:
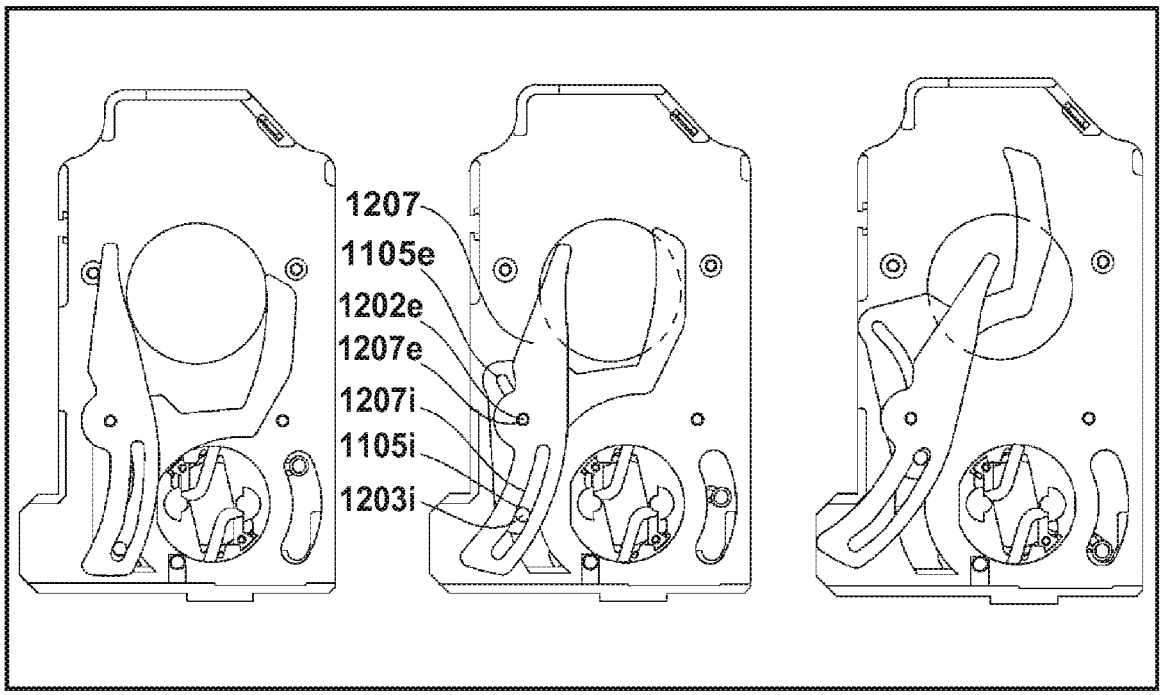
FIG. 31 is a front view of a fifth blade pair according to the ninth embodiment.

FIG. 30 is an exploded perspective view of a diaphragm device that is the ninth embodiment of a light amount adjusting device according to the present invention. FIG. 31 is a front view of a fifth blade pair according to the ninth embodiment. A diaphragm blade 1105 and a diaphragm blade 1207 form a fifth diaphragm blade pair.

In the ninth embodiment, the diaphragm blade 1107 according to the first embodiment is replaced with the diaphragm blade 1207.

The diaphragm blade 1207 slidably engages with a blade drive pin 1203*i* of a drive lever 1203 in a drive cam groove portion 1207*i*. In addition, a rotation center pin 1202*e* serving as a rotation center portion (rotation center axis portion) formed on a base plate 1202 rotatably engages with a rotation center hole portion 1207*e* that is an engaging portion formed in the diaphragm blade 1207.

When the drive lever 1203 pivots within a predetermined angle range, the drive cam groove portion 1207*i* receives the driving force from the blade drive pin 1203*i*, and the diaphragm blade 1207 rotates (turns) in an optical axis orthogonal plane about the rotation center pin 1202*e* engaging with the rotation center hole portion 1207*e*, as shown in FIG. 31. The speed of the rotation can be adjusted by the shape of the drive cam groove portion 1207*i*. In addition, the shape of the diaphragm opening can also be corrected by the shape of the drive cam groove portion 1207*i*.

Figure 32:
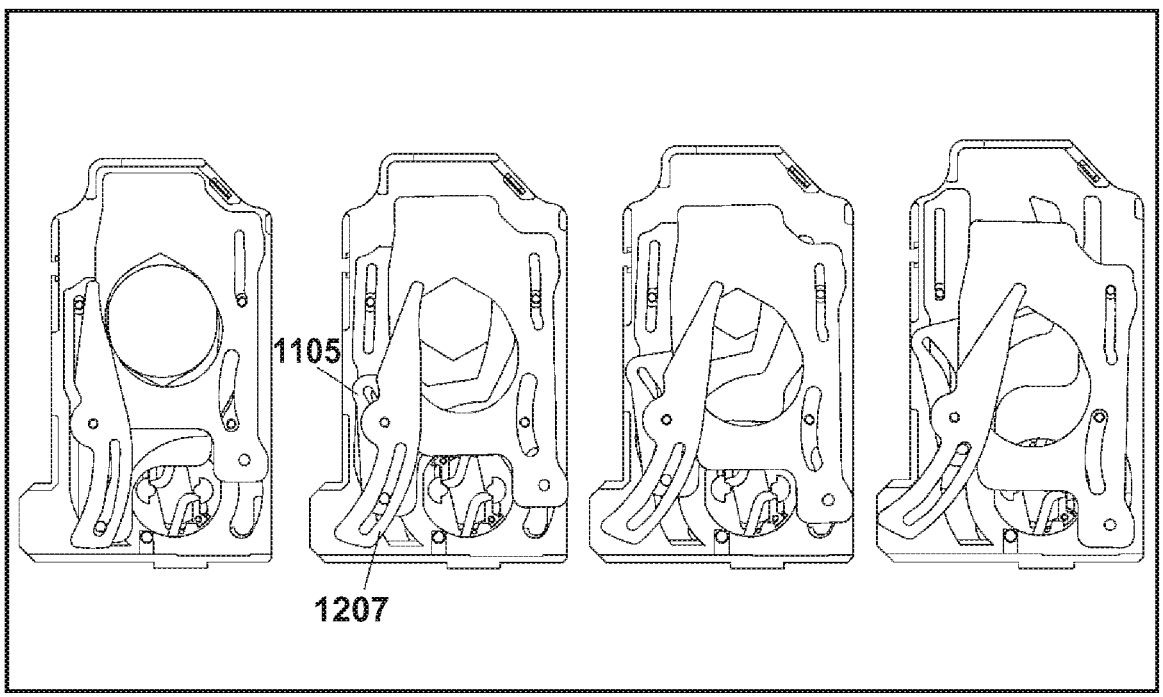
FIG. 32 is a front view showing a change of a diaphragm opening according to the ninth embodiment.

A pair of straight blades is the same as in the first embodiment. In the ninth embodiment, as shown in FIG. 32, a diaphragm opening close to a circle or with an almost regular hexagonal shape can be formed in each diaphragm state from a full-aperture state (left view) to a stopped-down-aperture state (right view).

Summary of Eighth and Ninth Embodiments

In the summary of the concept of the eighth and ninth embodiments, a "swing blade" means a diaphragm blade that makes a motion to swing as a whole when the blade drive pin 1103$i$ serving as the rotation center moves, like the diaphragm blade 1105 and the diaphragm blade 1107 shown in FIG. 24. In addition, a "pivot blade" means a diaphragm blade for which the rotation center pin 1202$e$ serving as the rotation center is erected and fixed and which makes a motion to pivot about the fixed center, like the diaphragm blade 1207 show in FIG. 30.

Note that in the eighth embodiment, both the pair of straight blades and the first blade pair are formed by "swing blades", and "pivot blades" are not used. In the ninth embodiment, both the pair of straight blades and one blade of the fifth blade pair are formed by "swing blades", and the other blade of the fifth blade pair is formed by a "pivot blade".

The present invention is not limited to the above embodiments, and various changes and modifications can be made within the spirit and scope of the present invention. Therefore, to apprise the public of the scope of the present invention, the following claims are made.

The invention claimed is:

1. A light amount adjusting device comprising:
an opening forming member configured to form an opening portion through which light passes;
a blade group configured to move on the opening forming member and to form a part of a light passing opening in the opening portion; and
a power transmission member arranged outside the opening portion and engaging with the blade group to transmit power,
wherein the blade group includes (a) a straight blade configured to move linearly and (b) a plurality of swing blades configured to swing from both sides in a straight-ahead operation of the straight blade toward a center of the light passing opening,
wherein the plurality of swing blades includes (a) a first swing blade having a long hole and (b) a second swing blade having a long hole or a rotation center hole,
wherein a guide pin arranged on the opening forming member is inserted into the long hole of the first swing blade and into the long hole or the rotation center hole of the second swing blade, and
wherein the first swing blade and the second swing blade slide with respect to the guide pin by being transmitted power by the power transmission member.

2. The light amount adjusting device according to claim 1, wherein the power transmission member comprises:
a pivot center provided at a position apart from a center of the opening portion in a straight-ahead direction of the straight blade; and
a plurality of arm portions provided across the pivot center in a direction orthogonal to the straight-ahead direction, and
wherein all blades included in the blade group engage with one of the arm portions of the power transmission member, and all blades other than the blade group engage with the other arm portion which is arranged at an opposite side of the one of the arm portions with respect to the pivot center.

3. A light amount adjusting device comprising:
an opening forming member configured to form an opening portion through which light passes;
a blade group configured to move on the opening forming member and to form a light passing opening in the opening portion; and
a power transmission member arranged outside the opening portion and engaging with the blade group to transmit power,
wherein the blade group includes (a) a pair of straight blades arranged on both sides of the opening portion to face each other on a straight line that connects the opening portion and the power transmission member and configured to move forward and backward with respect to the opening portion, and (b) a plurality of swing blades configured to swing in an oblique direction with respect to the opening portion on both sides of a moving direction of the pair of straight blades and enter the opening portion,
wherein in a process in which one end of the power transmission member engaging with a first blade group included in the blade group approaches the opening portion, and the other end of the power transmission member engaging with a second blade group included in the blade group separates from the opening portion, a first opening edge portion forming a half of the light passing opening on a side of the power transmission member is formed by the first blade group, and a second opening edge portion forming a remaining half of the light passing opening on a side opposite to the side of the power transmission member is formed by the second blade group,
wherein the first blade group includes one straight blade of the pair of straight blades and another first blade pair, the second blade group includes the other straight blade of the pair of straight blades and another second blade pair, and at least one blade pair of the other first blade pair and the other second blade pair is formed by the plurality of swing blades,
wherein the plurality of swing blades includes (a) a first swing blade having a long hole and (b) a second swing blade having a long hole or a rotation center hole,
wherein a guide pin arranged on the opening forming member is inserted into the long hole of the first swing blade and into the long hole or the rotation center hole of the second swing blade, and
wherein the first swing blade and the second swing blade slide with respect to the guide pin by being transmitted power by the power transmission member.

4. The light amount adjusting device according to claim 3, wherein in the first blade group, a central edge portion of the first opening edge portion is formed by the one straight blade, and an edge portion other than the central edge portion of the first opening edge portion is formed by the other first blade pair, and in the second blade group, a central edge portion of the second opening edge portion is formed by the other straight blade, and an edge portion other than the central edge portion of the second opening edge portion is formed by the other second blade pair.

5. The light amount adjusting device according to claim 3, wherein that all blades of the other first blade pair and the other second blade pair are formed by the plurality of swing blades.

6. The light amount adjusting device according to claim 3, wherein the other first blade pair is formed by the plurality of swing blades, and the other second blade pair is formed by pivot blades configured to pivot with respect to the opening portion.

7. The light amount adjusting device according to claim 3, wherein a first guide pin inserted into a long hole provided in the pair of straight blades and configured to guide a movement of the pair of straight blades is erected on the opening forming member.

8. A light amount adjusting device comprising:
an opening forming member configured to form an opening portion through which light passes;
a blade group configured to move on the opening forming member and to form a light passing opening in the opening portion; and
a power transmission member arranged outside the opening portion and engaging with the blade group to transmit power,
wherein the blade group includes (a) a pair of straight blades arranged on both sides of the opening portion to face each other on a straight line that connects the opening portion and the power transmission member and configured to move forward and backward with respect to the opening portion, and (b) a plurality of swing blades configured to swing in an oblique direction with respect to the opening portion on both sides of a moving direction of the pair of straight blades and enter the opening portion,
wherein in a process in which one end of the power transmission member engaging with a first blade group included in the blade group approaches the opening portion, and the other end of the power transmission member engaging with a second blade group included in the blade group separates from the opening portion, a first opening edge portion forming a portion of the light passing opening on a side of the power transmission member is formed by the first blade group, and a second opening edge portion forming a remaining portion of the light passing opening on a side opposite to the side of the power transmission member is formed by the second blade group,
wherein one of the first blade group and the second blade group includes one straight blade of the pair of straight blades and another blade pair, the other of the first blade group and the second blade group is formed by only the other straight blade of the pair of straight blades, and at least one blade of the other blade pair is formed by the plurality of swing blades,
wherein the plurality of swing blades include a first swing blade having a long hole and a second swing blade having a long hole or a rotation center hole,
wherein a guide pin arranged on the opening forming member is inserted into the long hole of the first swing blade and into the long hole or the rotation center hole of the second swing blade, and
wherein the first swing blade and the second swing blade slide with respect to the guide pin by being transmitted power by the power transmission member.

9. The light amount adjusting device according to claim 8, wherein in the first blade group, a central edge portion of the first opening edge portion is formed by the one straight blade, and an edge portion other than the central edge portion of the first opening edge portion is formed by the other blade pair, and in the second blade group, a central edge portion of the second opening edge portion is formed by the other straight blade.

10. The light amount adjusting device according to claim 8, wherein all blades of the other blade pair are formed by the plurality of swing blades.

11. The light amount adjusting device according to claim 9, wherein one blade of the other blade pair is formed by a swing blade of the plurality of swing blades, and the other blade of the other blade pair is formed by a pivot blade configured to pivot with respect to the opening portion.

12. The light amount adjusting device according to claim 8, wherein a first guide pin inserted into a long hole provided in the pair of straight blades and configured to guide a movement of the pair of straight blades is erected on the opening forming member.

13. A light amount adjusting device comprising:
an opening forming member configured to form an opening portion through which light passes;
a blade group configured to move on the opening forming member and to form a light passing opening in the opening portion; and
a power transmission member arranged outside the opening portion and transmitting a power by driving pins which are arranged at respective ends of an arm rotating outside the opening portion and which engage with the blade group,
wherein the blade group includes (a) a pair of straight blades configured to operate linearly and to form (1) one part of the light passing opening which is positioned at the power transmission member side and (2) another part of the light passing opening which is positioned opposite to the power transmission member and (b) a plurality of swing blades configured to swing from both sides in a straight-ahead operation of the straight blade toward a center of the light passing opening from a same side of the straight blades,
wherein each of a group of holes formed in each straight blade of the pair of straight blades and each of the plurality of swing blades which swing toward a center of the light passing opening from a same side of the each straight blade engages one of the driving pins, and each of a group of long holes formed in each straight blade of the pair of straight blades and each of the plurality of swing blades which swing toward the center of the light passing opening from same side of the each straight blade slidably engages a single guide pin arranged on the opening forming member, and
wherein each of the plurality of swing blades slides with respect to the single guide pin by being transmitted power by the power transmission member.

14. A light amount adjusting device comprising:
an opening forming member configured to form an opening portion through which light passes;
a blade group configured to move on the opening forming member and to form a part of a light passing opening in the opening portion; and
a power transmission member arranged outside the opening portion and having an arm portion rotating outside the opening portion, wherein driving pins are at arranged respective ends of the arm portion and engage with the blade group to transmit power,
wherein the blade group includes (a) a straight blade configured to move linearly and (b) a plurality of swing blades configured to swing from both sides in a straight-ahead operation of the straight blade toward a center of the light passing opening, and
wherein at least one swing blade of the plurality of swing blades has a long hole whose curvature is opposite to a curvature of a moving locus of the driving pin that engages the at least one swing blade, and the at least one swing blade moves towards the center of the opening from the other side of the driving pin that engages the at least one swing blade with respect to the center of the opening.

15. An optical apparatus comprising:
the light amount adjusting device according to claim 1; and
an image sensor that captures light passed through the light amount adjusting device.

16. An optical apparatus comprising:
the light amount adjusting device according to claim 3; and
an image sensor that captures light passed through the light amount adjusting device.

17. An optical apparatus comprising:
the light amount adjusting device according to claim 8; and
an image sensor that captures light passed through the light amount adjusting device.

18. An optical apparatus comprising:
the light amount adjusting device according to claim 13; and
an image sensor that captures light passed through the light amount adjusting device.

19. An optical apparatus comprising:
the light amount adjusting device according to claim 15; and
an image sensor that captures light passed through the light amount adjusting device.

* * * * *